(12) United States Patent
Liang et al.

(10) Patent No.: US 12,467,297 B1
(45) Date of Patent: Nov. 11, 2025

(54) WINDOW BALANCE ASSEMBLY WITH IMPROVED BRAKE ARRANGEMENT

(71) Applicant: Vision Industries Group, Inc., Somerset, NJ (US)

(72) Inventors: Luke Liang, Somerset, NJ (US); Joe Blackwell, Brick, NJ (US)

(73) Assignee: Vision Industries Group, Inc., Somerset, NJ (US)

( * ) Notice: Subject to any disclaimer, the term of this patent is extended or adjusted under 35 U.S.C. 154(b) by 91 days.

(21) Appl. No.: 18/515,600

(22) Filed: Nov. 21, 2023

Related U.S. Application Data

(63) Continuation-in-part of application No. 18/363,110, filed on Aug. 1, 2023.

(60) Provisional application No. 63/514,159, filed on Jul. 18, 2023.

(51) Int. Cl.
*E05D 13/00* (2006.01)
*E05D 15/22* (2006.01)

(52) U.S. Cl.
CPC ..... *E05D 13/1292* (2013.01); *E05D 13/1276* (2013.01); *E05D 15/22* (2013.01); *E05Y 2201/10* (2013.01); *E05Y 2201/21* (2013.01); *E05Y 2201/25* (2013.01); *E05Y 2201/26* (2013.01); *E05Y 2900/148* (2013.01)

(58) Field of Classification Search
CPC .. E05D 13/1276; E05D 13/1292; E05D 15/22
See application file for complete search history.

(56) References Cited

U.S. PATENT DOCUMENTS

| | | |
|---|---|---|
| 230,476 A | 7/1880 | Green |
| 234,387 A | 11/1880 | Burgess |
| 284,993 A | 9/1883 | Abele |
| 314,350 A | 3/1885 | Smith |
| 316,285 A | 4/1885 | McKeen |
| 331,005 A | 11/1885 | Sahr |
| 336,302 A | 2/1886 | Dudgeon |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Jeffrey O'Brien
(74) *Attorney, Agent, or Firm* — Thomas A. O'Rourke; James Bongiorno; O'Rourke IP Law, PLLC

(57) ABSTRACT

A window balance assembly includes: a housing with first and second interior spaces; a receiver rotatably supported in the first interior space; a curl spring disposed in the second interior space with a tail extending out of the housing; and a mounting bracket. The tail includes: a neck and a head. The mounting bracket includes first and second flanges. First and second guide members protrude from opposite sides of a rear surface of the first flange, and slidably support the tail proximate to the rear surface. First and second ramp members on the rear surface include an upper recess, and are spaced permitting passage of the neck therebetween. When the tail slides between the second guide members the ramp members force the head away from the rear surface, until the head passes beyond the ramp members. The curl spring biases the head into the recesses.

7 Claims, 38 Drawing Sheets

(56) References Cited

U.S. PATENT DOCUMENTS

| | | |
|---|---|---|
| 346,788 A | 8/1886 | Teufel |
| 350,678 A | 10/1886 | Hussey |
| 353,287 A | 11/1886 | Chumard |
| 368,595 A | 8/1887 | King |
| 369,885 A | 9/1887 | Shaw |
| 375,656 A | 12/1887 | Shaw |
| 376,252 A | 1/1888 | McIntyre |
| 379,910 A | 3/1888 | Rosentreter |
| 410,728 A | 9/1889 | Brown |
| 417,868 A | 12/1889 | Janes |
| 423,761 A | 3/1890 | Hasenpflug |
| 426,303 A | 4/1890 | McGovern |
| 447,068 A | 2/1891 | Dixon |
| 452,723 A | 5/1891 | Schmalhausen |
| 471,363 A | 3/1892 | Sloan |
| 480,148 A | 8/1892 | Theby |
| 493,159 A | 3/1893 | Gibson |
| 509,941 A | 12/1893 | Perry |
| 512,593 A | 1/1894 | Webster |
| 520,754 A | 5/1894 | Burmeister |
| 526,118 A | 9/1894 | Sharp |
| 528,656 A | 11/1894 | Burmeister |
| 530,078 A | 12/1894 | Ammerman |
| 532,935 A | 1/1895 | Woolery |
| 534,185 A | 2/1895 | Winchester |
| 537,258 A | 4/1895 | Wilcox |
| 539,030 A | 5/1895 | Bitner |
| 551,181 A | 12/1895 | Dillon |
| 551,242 A | 12/1895 | Wallace |
| 554,448 A | 2/1896 | Keil |
| 564,426 A | 7/1896 | Hubbard |
| 572,591 A | 12/1896 | Woodard |
| 587,424 A | 8/1897 | Bonine |
| 590,225 A | 9/1897 | Hill |
| 653,458 A | 7/1900 | Paquette |
| 666,596 A | 1/1901 | Breen |
| 683,928 A | 10/1901 | Geraghty |
| 688,491 A | 12/1901 | Sigler |
| 695,736 A | 3/1902 | Kendrick |
| 698,742 A | 4/1902 | Schamweber |
| 699,696 A | 5/1902 | Mellen |
| 708,406 A | 9/1902 | Robison |
| 714,343 A | 11/1902 | Wellman |
| 718,007 A | 1/1903 | Linn |
| 719,981 A | 2/1903 | Adams |
| 722,162 A | 3/1903 | St. Louis |
| 724,466 A | 4/1903 | Hannan |
| 743,716 A | 11/1903 | Hadka |
| 744,755 A | 11/1903 | Hasenpflug |
| 745,888 A | 12/1903 | McElwee |
| 749,469 A | 1/1904 | Assorati |
| 756,453 A | 4/1904 | Arens |
| 756,559 A | 4/1904 | Arens |
| 757,249 A | 4/1904 | Barnard |
| 759,642 A | 5/1904 | Sparks |
| 764,493 A | 7/1904 | Noseworthy |
| 769,386 A | 9/1904 | Johnson |
| 769,767 A | 9/1904 | Phelps |
| 774,536 A | 11/1904 | Saunders |
| 775,602 A | 11/1904 | Hearnshaw |
| 800,043 A | 9/1905 | Witte |
| 804,994 A | 11/1905 | Andrews |
| 815,537 A | 3/1906 | Kissinger |
| 833,900 A | 10/1906 | Sigler |
| 837,811 A | 12/1906 | Ebbeson |
| 840,427 A | 1/1907 | Brister |
| 865,090 A | 9/1907 | Eddy |
| 866,073 A | 9/1907 | Saunders |
| 878,206 A | 2/1908 | Johnson |
| 881,658 A | 3/1908 | Bowman |
| 886,108 A | 4/1908 | Allen |
| 887,690 A | 5/1908 | Pearce |
| 897,719 A | 9/1908 | Daubaignan |
| 900,079 A | 10/1908 | Bittorf |
| 910,850 A | 1/1909 | Petrie |
| 913,730 A | 3/1909 | Kapus |
| 922,894 A | 5/1909 | Heid |
| 926,899 A | 7/1909 | Roy |
| 928,408 A | 7/1909 | Taube |
| 948,628 A | 2/1910 | Jefferis |
| 959,150 A | 5/1910 | Morris |
| 963,983 A | 7/1910 | Bernhard |
| 966,063 A | 8/1910 | Toothaker |
| 976,777 A | 11/1910 | Brown |
| 980,131 A | 12/1910 | Shean |
| 998,642 A | 7/1911 | Shean |
| 1,003,386 A | 9/1911 | Welker |
| 1,006,211 A | 10/1911 | Hermon |
| 1,020,454 A | 3/1912 | Seidenbecker |
| 1,041,803 A | 10/1912 | Kilburn |
| 1,051,918 A | 2/1913 | Rowley |
| 1,059,999 A | 4/1913 | James |
| 1,069,079 A | 7/1913 | Voight |
| 1,077,487 A | 11/1913 | Miller |
| 1,080,172 A | 12/1913 | Rusk |
| 1,100,820 A | 6/1914 | Edwards |
| 1,121,228 A | 12/1914 | Burkhart |
| 1,122,026 A | 12/1914 | O'Rourke |
| 1,127,835 A | 2/1915 | Westlund |
| 1,133,217 A | 3/1915 | Barton |
| 1,141,437 A | 6/1915 | Unterlender |
| 1,148,712 A | 8/1915 | Overland |
| 1,163,086 A | 12/1915 | Harper |
| 1,173,129 A | 2/1916 | Taliaferro |
| 1,177,637 A | 4/1916 | Lane |
| 1,177,838 A | 4/1916 | Wilkinson |
| 1,207,989 A | 12/1916 | O'Rourke |
| 1,232,683 A | 7/1917 | Haillis |
| 1,243,115 A | 10/1917 | Shur |
| 1,244,725 A | 10/1917 | Gadke |
| 1,253,810 A | 1/1918 | Gianninoto |
| 1,261,274 A | 4/1918 | Newsam |
| 1,269,467 A | 6/1918 | Winters |
| 1,270,740 A | 6/1918 | Keyes |
| 1,272,900 A | 7/1918 | Berman |
| 1,279,353 A | 9/1918 | Kelley |
| 1,311,052 A | 7/1919 | Danforth |
| 1,322,677 A | 11/1919 | Ditlefsen |
| 1,338,250 A | 4/1920 | Parkes |
| 1,338,416 A | 4/1920 | Bellinger |
| 1,339,362 A | 5/1920 | L'Heureux |
| 1,341,234 A | 5/1920 | Horton |
| 1,350,698 A | 8/1920 | Boedtcher |
| 1,387,302 A | 8/1921 | Page |
| 1,388,272 A | 8/1921 | Lawrence |
| 1,393,628 A | 10/1921 | Leichter |
| 1,398,174 A | 11/1921 | Carlson |
| 1,399,897 A | 12/1921 | Singer |
| 1,412,154 A | 4/1922 | Wollesen |
| 1,439,585 A | 12/1922 | Trost |
| 1,461,467 A | 7/1923 | Stuart |
| 1,463,866 A | 8/1923 | Bourbeau |
| 1,470,858 A | 10/1923 | Maxwell |
| 1,485,382 A | 3/1924 | Foley |
| 1,490,874 A | 4/1924 | Webb |
| 1,516,995 A | 11/1924 | Trigueiro |
| 1,550,532 A | 8/1925 | French |
| 1,552,690 A | 9/1925 | Frantz |
| 1,587,037 A | 6/1926 | Rudolph |
| 1,601,051 A | 9/1926 | Wilbert |
| 1,605,717 A | 11/1926 | Gregg |
| 1,619,031 A | 3/1927 | Ostrosky |
| 1,622,742 A | 3/1927 | Shipman |
| 1,656,818 A | 1/1928 | Dillon |
| 1,692,579 A | 11/1928 | Schrader |
| 1,704,946 A | 3/1929 | Lindgren |
| 1,712,792 A | 5/1929 | Hansen |
| 1,715,957 A | 6/1929 | Stein |
| 1,724,637 A | 8/1929 | Bergstrom |
| 1,750,715 A | 3/1930 | Jeffers |
| 1,794,171 A | 2/1931 | Grutel |
| 1,812,288 A | 6/1931 | Drapeau |
| 1,819,824 A | 8/1931 | McAllister |
| 1,864,253 A | 6/1932 | McIntyre |

(56) References Cited

U.S. PATENT DOCUMENTS

| | | |
|---|---|---|
| 1,869,274 A | 7/1932 | Phillips |
| 1,877,177 A | 9/1932 | Hinderer |
| 1,891,940 A | 12/1932 | McAllister |
| 1,900,936 A | 3/1933 | Huttger |
| 1,901,974 A | 3/1933 | Macy |
| 1,918,114 A | 7/1933 | Lorenzen |
| 1,922,062 A | 8/1933 | Sullivan |
| 1,940,084 A | 12/1933 | Grasso |
| 1,960,034 A | 5/1934 | Stewart |
| 1,964,114 A | 6/1934 | Gerlach |
| 2,095,057 A | 10/1937 | Corrado |
| 2,122,661 A | 7/1938 | Rightmyer |
| 2,126,995 A | 8/1938 | Kingdon |
| 2,136,408 A | 11/1938 | Bedell |
| 2,158,260 A | 5/1939 | Stillman |
| 2,202,561 A | 5/1940 | Lahiere |
| 2,232,965 A | 2/1941 | Perl |
| 2,272,145 A | 2/1942 | Anderson |
| 2,326,084 A | 8/1943 | Westrope |
| 2,369,584 A | 2/1945 | Lundholm |
| 2,452,521 A | 10/1948 | Johnson |
| 2,480,016 A | 8/1949 | Granberg |
| 2,480,988 A | 9/1949 | Walton |
| 2,500,349 A | 3/1950 | Menns |
| 2,503,370 A | 4/1950 | Zanona |
| 2,523,559 A | 9/1950 | Couture |
| 2,527,278 A | 10/1950 | Schemansky |
| 2,537,736 A | 1/1951 | Carlson |
| 2,560,274 A | 7/1951 | Cantelo |
| 2,581,816 A | 1/1952 | Schlueter |
| 2,590,624 A | 3/1952 | James |
| 2,599,196 A | 6/1952 | Peremi |
| 2,605,125 A | 7/1952 | Emerson |
| 2,612,398 A | 9/1952 | Miller |
| 2,613,526 A | 10/1952 | Holmsten |
| 2,621,951 A | 12/1952 | Ostadal |
| 2,645,515 A | 7/1953 | Thomas |
| 2,648,967 A | 8/1953 | Holmsten |
| 2,670,982 A | 3/1954 | Banham |
| 2,692,789 A | 10/1954 | Rivard |
| 2,735,707 A | 2/1956 | Sylvan |
| 2,758,862 A | 8/1956 | Endter |
| 2,766,492 A | 10/1956 | Day |
| 2,789,851 A | 4/1957 | Lickteig |
| 2,818,919 A | 1/1958 | Sylvan |
| 2,846,258 A | 8/1958 | Granberg |
| 2,855,772 A | 10/1958 | Hillgren |
| 2,884,276 A | 4/1959 | Baptist |
| 2,920,914 A | 1/1960 | Jenkins |
| 2,941,832 A | 6/1960 | Grossman |
| 2,967,595 A | 1/1961 | Zitomer |
| 2,997,323 A | 8/1961 | Riser |
| 3,027,188 A | 3/1962 | Eichstadt |
| 3,122,387 A | 2/1964 | Wakelin |
| 3,135,542 A | 6/1964 | Wilkenson |
| 3,187,526 A | 6/1965 | Moler |
| 3,267,613 A | 8/1966 | McQuiston |
| 3,288,510 A | 11/1966 | Gough |
| 3,352,586 A | 11/1967 | Hakanson |
| 3,362,740 A | 1/1968 | Burns |
| 3,422,575 A | 1/1969 | Armstrong |
| 3,425,729 A | 2/1969 | Bisbing |
| 3,438,153 A | 4/1969 | Lemme |
| 3,469,877 A | 9/1969 | Hutchison |
| 3,599,452 A | 8/1971 | Maruyama |
| 3,600,019 A | 8/1971 | Toyota |
| 3,642,315 A | 2/1972 | Alpern |
| 3,645,573 A | 2/1972 | Strang |
| 3,683,652 A | 8/1972 | Halopoff |
| 3,706,467 A | 12/1972 | Martin |
| 3,762,750 A | 10/1973 | Orr |
| 3,811,718 A | 5/1974 | Bates |
| 3,907,348 A | 9/1975 | Bates |
| 3,919,808 A | 11/1975 | Simmons |
| 3,927,906 A | 12/1975 | Mieras |
| 3,930,678 A | 1/1976 | Alexander |
| 4,054,308 A | 10/1977 | Prohaska |
| 4,059,298 A | 11/1977 | Van Klompenburg |
| 4,063,766 A | 12/1977 | Granberg |
| 4,068,406 A * | 1/1978 | Wood .................. E05D 13/1207 49/446 |
| 4,068,871 A | 1/1978 | Mercer |
| 4,095,827 A | 6/1978 | Stavenau |
| 4,095,829 A | 6/1978 | Van Klompenburg |
| 4,102,546 A | 7/1978 | Costello |
| 4,151,682 A | 5/1979 | Schmidt |
| 4,165,894 A | 8/1979 | Wojciechowski |
| 4,223,930 A | 9/1980 | Costello |
| 4,227,345 A | 10/1980 | Durham |
| 4,235,465 A | 11/1980 | Costello |
| 4,253,688 A | 3/1981 | Hosooka |
| 4,261,602 A | 4/1981 | Anderson |
| 4,274,666 A | 6/1981 | Peck |
| 4,293,154 A | 10/1981 | Cassells |
| 4,303,264 A | 12/1981 | Uehara |
| 4,305,612 A | 12/1981 | Hunt |
| 4,392,329 A | 7/1983 | Suzuki |
| 4,429,910 A | 2/1984 | Anderson |
| 4,470,277 A | 9/1984 | Uyeda |
| 4,475,311 A | 10/1984 | Gibson |
| 4,525,952 A | 7/1985 | Cunningham |
| 4,580,366 A | 4/1986 | Hardy |
| 4,587,759 A | 5/1986 | Gray |
| 4,621,847 A | 11/1986 | Paulson |
| 4,624,073 A | 11/1986 | Randall |
| 4,639,021 A | 1/1987 | Hope |
| 4,643,005 A | 2/1987 | Logas |
| 4,655,489 A | 4/1987 | Bisbing |
| 4,736,972 A | 4/1988 | Mosch |
| 4,801,164 A | 1/1989 | Mosch |
| 4,813,725 A | 3/1989 | Mosch |
| 4,824,154 A | 4/1989 | Simpson |
| 4,826,222 A | 5/1989 | Davis |
| 4,827,685 A | 5/1989 | Schmidt |
| 4,893,849 A | 1/1990 | Schlack |
| 4,922,658 A | 5/1990 | Coddens |
| 4,923,230 A | 5/1990 | Simpson |
| 4,949,506 A | 8/1990 | Durham |
| 4,953,258 A * | 9/1990 | Mennuto ............. E05D 13/1276 16/193 |
| 4,961,286 A | 10/1990 | Bezubic |
| 4,991,886 A | 2/1991 | Noite |
| 5,042,855 A | 8/1991 | Bennett |
| 5,072,464 A | 12/1991 | Draheim |
| 5,076,015 A | 12/1991 | Manzalini |
| 5,087,087 A | 2/1992 | Vetter |
| 5,087,088 A | 2/1992 | Milam |
| 5,090,750 A | 2/1992 | Lindqvist |
| 5,090,754 A | 2/1992 | Thompson |
| 5,092,640 A | 3/1992 | Plummer |
| 5,110,165 A | 5/1992 | Piltingsrud |
| 5,127,685 A | 7/1992 | Dallaire |
| 5,139,291 A | 8/1992 | Schultz |
| 5,143,412 A | 9/1992 | Lindqvist |
| 5,161,839 A | 11/1992 | Piltingsrud |
| 5,165,737 A | 11/1992 | Riegelman |
| 5,183,310 A | 2/1993 | Shaughnessy |
| 5,217,264 A | 6/1993 | Fier |
| 5,219,193 A | 6/1993 | Piltingsrud |
| 5,243,783 A * | 9/1993 | Schmidt .................. E05D 15/22 49/176 |
| 5,244,238 A | 9/1993 | Lindqvist |
| 5,248,174 A | 9/1993 | Matz |
| 5,274,955 A | 1/1994 | Dallaire |
| 5,301,467 A * | 4/1994 | Schmidt .............. E05D 13/1207 49/176 |
| 5,341,752 A | 8/1994 | Hambleton |
| 5,371,971 A * | 12/1994 | Prete ...................... E05D 15/22 49/181 |
| 5,398,447 A | 3/1995 | Morse |
| 5,437,484 A | 8/1995 | Yamada |
| 5,448,857 A | 9/1995 | Stormo |
| 5,452,925 A | 9/1995 | Huang |
| 5,454,609 A | 10/1995 | Slocomb |

(56) References Cited

U.S. PATENT DOCUMENTS

| | | | |
|---|---|---|---|
| 5,536,052 A | 7/1996 | Maier | |
| 5,553,903 A | 9/1996 | Prete | |
| 5,560,149 A | 10/1996 | Lafevre | |
| 5,575,116 A | 11/1996 | Carlson | |
| 5,582,445 A | 12/1996 | Olsen | |
| RE35,463 E | 2/1997 | Vetter | |
| 5,632,117 A * | 5/1997 | Prete | E05D 15/22 49/181 |
| 5,636,475 A | 6/1997 | Nidelkoff | |
| 5,669,180 A * | 9/1997 | Maier | E05D 15/22 49/176 |
| 5,688,000 A | 11/1997 | Dolman | |
| 5,715,631 A | 2/1998 | Kailian | |
| 5,741,032 A | 4/1998 | Chaput | |
| 5,778,602 A | 7/1998 | Johnson | |
| 5,791,700 A | 8/1998 | Biro | |
| 5,806,900 A | 9/1998 | Bratcher | |
| 5,829,196 A | 11/1998 | Maier | |
| 5,839,767 A | 11/1998 | Piltingsrud | |
| 5,901,499 A | 5/1999 | Delaske | |
| 5,901,501 A | 5/1999 | Fountaine | |
| 5,911,763 A | 6/1999 | Quesada | |
| 5,927,768 A | 7/1999 | Dallmann | |
| 5,970,656 A | 10/1999 | Maier | |
| 5,992,907 A | 11/1999 | Sheldon | |
| 6,000,735 A | 12/1999 | Jourdenais | |
| 6,041,475 A * | 3/2000 | Nidelkoff | E05D 15/22 49/181 |
| 6,086,121 A | 7/2000 | Buckland | |
| 6,116,665 A | 9/2000 | Subliskey | |
| 6,119,398 A * | 9/2000 | Yates, Jr. | E05D 13/08 49/176 |
| 6,135,510 A | 10/2000 | Diginosa | |
| 6,139,071 A | 10/2000 | Hopper | |
| 6,142,541 A | 11/2000 | Rotondi | |
| 6,155,615 A | 12/2000 | Schulz | |
| 6,161,335 A * | 12/2000 | Beard | E05D 15/22 49/176 |
| 6,176,041 B1 | 1/2001 | Roberts | |
| 6,178,696 B1 | 1/2001 | Liang | |
| 6,183,024 B1 | 2/2001 | Schultz | |
| 6,209,931 B1 | 4/2001 | Von Stoutenborough | |
| 6,217,087 B1 | 4/2001 | Fuller | |
| 6,230,443 B1 | 5/2001 | Schultz | |
| 6,250,694 B1 | 6/2001 | Welland | |
| 6,279,266 B1 | 8/2001 | Searcy | |
| 6,332,288 B1 * | 12/2001 | Guillemet | E05D 13/08 49/181 |
| 6,349,576 B2 | 2/2002 | Subliskey | |
| 6,364,375 B1 | 4/2002 | Szapucki | |
| 6,450,544 B2 | 9/2002 | Rotondi | |
| 6,546,671 B2 | 4/2003 | Mitchell | |
| 6,550,184 B1 * | 4/2003 | O'Donnell | E05D 15/22 49/176 |
| 6,565,133 B1 | 5/2003 | Timothy | |
| 6,568,723 B2 | 5/2003 | Murphy | |
| 6,588,150 B1 | 7/2003 | Wong | |
| 6,592,155 B1 | 7/2003 | Lemley | |
| 6,607,221 B1 | 8/2003 | Elliot | |
| 6,631,931 B2 | 10/2003 | Magnusson | |
| 6,634,683 B1 | 10/2003 | Brannan | |
| 6,688,659 B2 | 2/2004 | Kobrehel | |
| 6,817,142 B2 | 11/2004 | Marshik | |
| 6,848,728 B2 | 2/2005 | Rotondi | |
| 6,871,885 B2 | 3/2005 | Goldenberg | |
| 6,871,886 B2 | 3/2005 | Coleman | |
| 6,877,784 B2 | 4/2005 | Kelley | |
| 6,925,758 B2 | 8/2005 | Petit | |
| 6,957,513 B2 | 10/2005 | Pettit | |
| 6,983,963 B2 | 1/2006 | Eslick | |
| 7,000,957 B2 | 2/2006 | Lawrence | |
| 7,013,603 B2 | 3/2006 | Eenigenburg | |
| 7,017,957 B2 | 3/2006 | Murphy | |
| 7,028,371 B2 * | 4/2006 | VerSteeg | E05D 13/1207 49/181 |
| 7,036,851 B2 | 5/2006 | Romig | |
| 7,063,361 B1 | 6/2006 | Lawrence | |
| 7,070,211 B2 | 7/2006 | Polowinczak | |
| 7,070,215 B2 | 7/2006 | Kelley | |
| 7,100,951 B2 | 9/2006 | Jien | |
| 7,147,255 B2 | 12/2006 | Goldenberg | |
| 7,159,908 B2 | 1/2007 | Liang | |
| 7,171,784 B2 | 2/2007 | Eenigenburg | |
| 7,296,831 B2 | 11/2007 | Generowicz | |
| 7,322,619 B2 | 1/2008 | Nolte | |
| 7,322,620 B1 | 1/2008 | Lawrence | |
| 7,407,199 B2 | 8/2008 | Richardson | |
| 7,431,356 B2 | 10/2008 | Liang | |
| 7,441,811 B2 | 10/2008 | Lawrence | |
| 7,481,470 B2 | 1/2009 | Eenigenburg | |
| 7,510,221 B2 | 3/2009 | Eenigenburg | |
| 7,530,611 B2 | 5/2009 | Liang | |
| 7,559,588 B2 | 7/2009 | Liang | |
| 7,607,262 B2 | 10/2009 | Pettit | |
| 7,637,544 B2 | 12/2009 | Liang | |
| 7,665,775 B1 | 2/2010 | Miller | |
| 7,699,365 B2 | 4/2010 | Liang | |
| 7,922,223 B2 | 4/2011 | Lawrence | |
| 7,976,077 B2 | 7/2011 | Flory | |
| 8,205,919 B2 | 6/2012 | Flory | |
| 8,205,920 B2 | 6/2012 | Flory | |
| 8,220,846 B2 | 7/2012 | Liang | |
| 8,231,148 B2 | 7/2012 | Van Der Kooij | |
| 8,235,430 B2 | 8/2012 | Liang | |
| 8,272,164 B2 | 9/2012 | Albrecht | |
| 8,336,930 B2 | 12/2012 | Liang | |
| 8,360,484 B2 | 1/2013 | Liang | |
| 8,414,039 B2 | 4/2013 | Liang | |
| 8,511,724 B2 | 8/2013 | Liang | |
| 8,550,507 B2 | 10/2013 | Barton | |
| 8,561,260 B2 * | 10/2013 | Baker | E06B 3/4415 16/401 |
| 8,567,830 B2 | 10/2013 | Liang | |
| 8,657,347 B2 | 2/2014 | Liang | |
| 8,726,572 B2 | 5/2014 | Derham | |
| 8,789,857 B2 | 7/2014 | Liang | |
| 8,789,862 B2 | 7/2014 | Liang | |
| 8,833,809 B2 | 9/2014 | Liang | |
| 8,844,985 B2 | 9/2014 | Liang | |
| 8,870,244 B2 | 10/2014 | Liang | |
| 8,881,461 B2 | 11/2014 | Derham | |
| 9,103,144 B2 | 8/2015 | Liang | |
| 9,140,033 B2 | 9/2015 | Wolf | |
| 9,309,709 B2 * | 4/2016 | DeNormand | E05D 13/1276 |
| 9,376,834 B2 | 6/2016 | Liang | |
| 9,493,970 B2 | 11/2016 | Campbell | |
| 9,816,300 B2 | 11/2017 | Derham | |
| 10,107,021 B1 | 10/2018 | Liang | |
| 10,415,287 B1 * | 9/2019 | Kunz | E06B 3/5063 |
| 10,563,440 B2 * | 2/2020 | Kellum | F16F 1/12 |
| 11,072,957 B2 * | 7/2021 | Newman | E05D 15/22 |
| 2006/0192391 A1 | 8/2006 | Pettit | |
| 2006/0244270 A1 | 11/2006 | Rotondi | |
| 2007/0205615 A1 | 9/2007 | Eenigenburg | |
| 2008/0012358 A1 | 1/2008 | Liang | |
| 2008/0022728 A1 | 1/2008 | Flory | |
| 2008/0169658 A1 | 7/2008 | Wolf | |
| 2010/0199726 A1 | 8/2010 | Varney | |
| 2010/0218425 A1 | 9/2010 | Nolte | |
| 2010/0263415 A1 | 10/2010 | Rupsil | |
| 2012/0126548 A1 * | 5/2012 | Zhuo | E05D 15/0604 292/169 |
| 2013/0214545 A1 | 8/2013 | Wolf | |
| 2013/0283695 A1 | 10/2013 | Hollerman | |
| 2016/0076282 A1 | 3/2016 | Wolf | |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

(56) References Cited

OTHER PUBLICATIONS

"Engineering Fit," available at: https://en.wikipedia.org/wiki/Engineering_fit, Jul. 8, 2019.

* cited by examiner

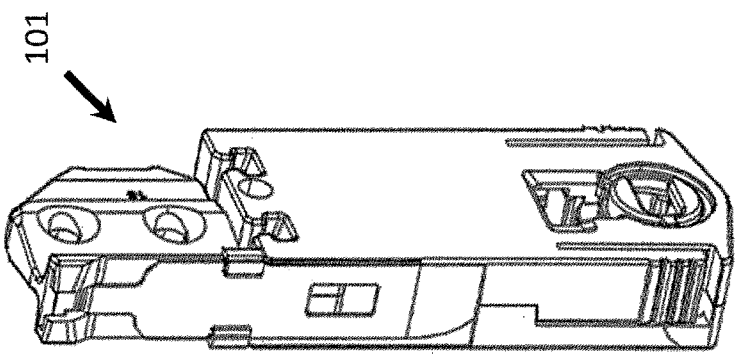
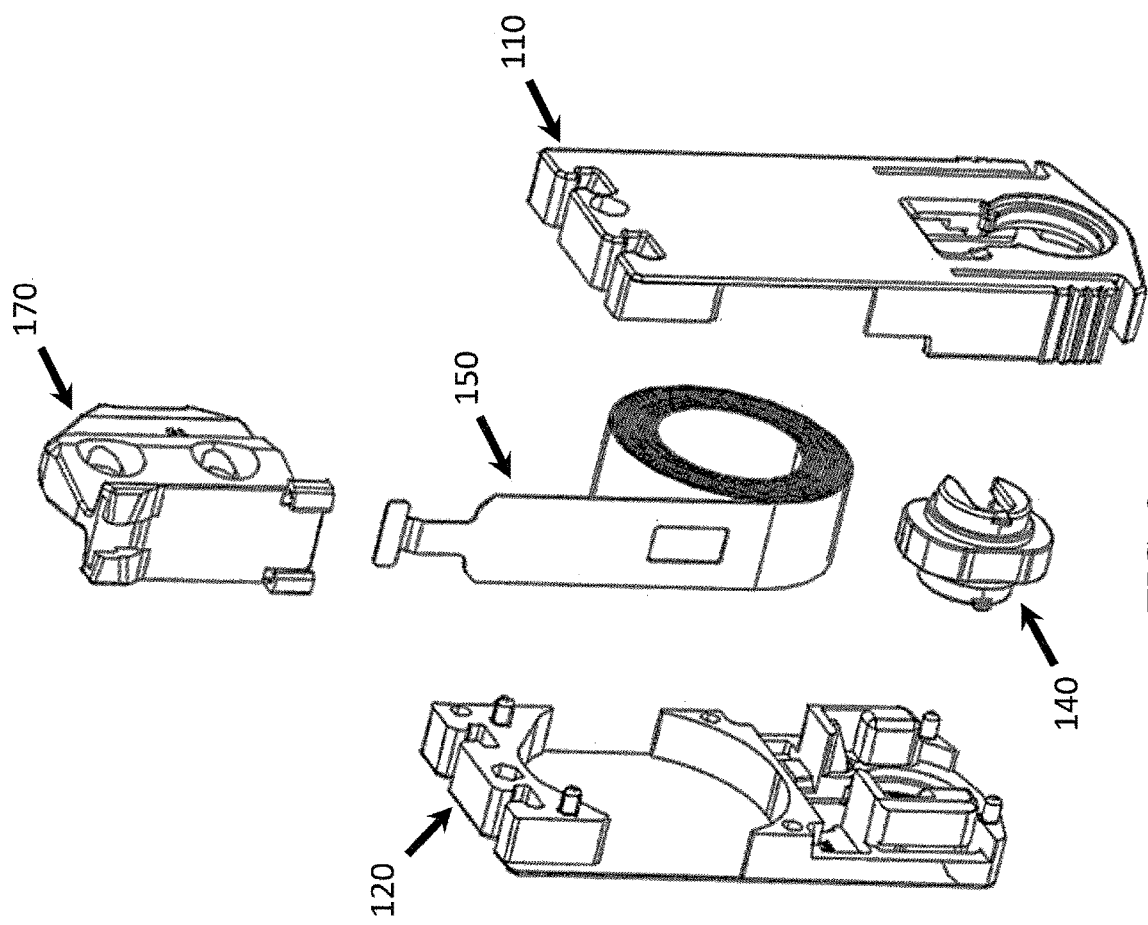

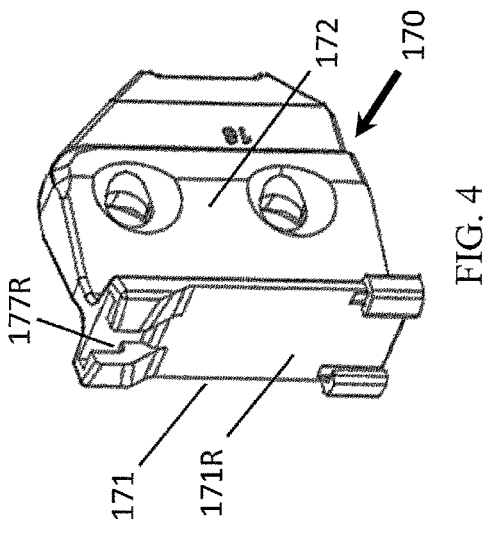
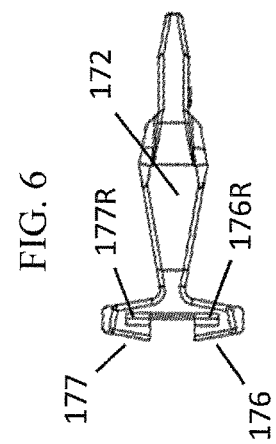
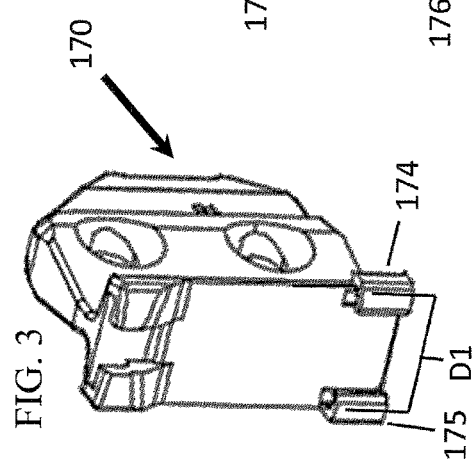
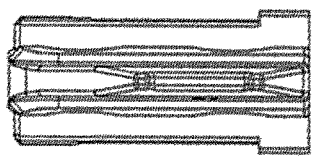
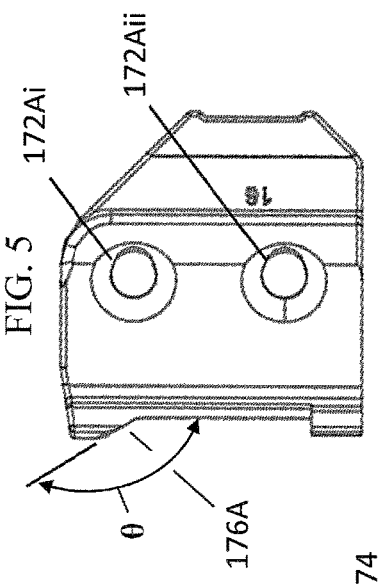
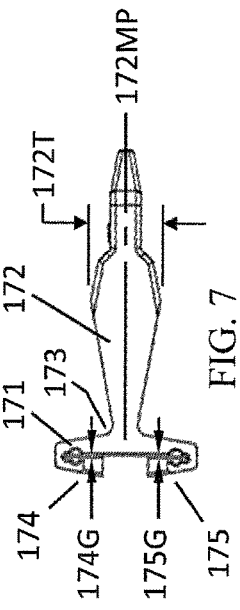
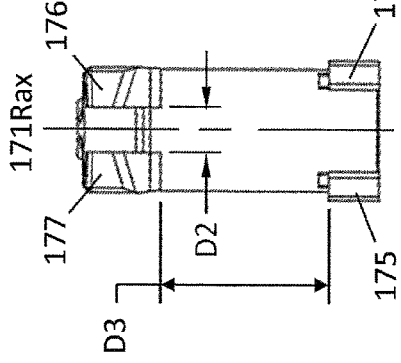

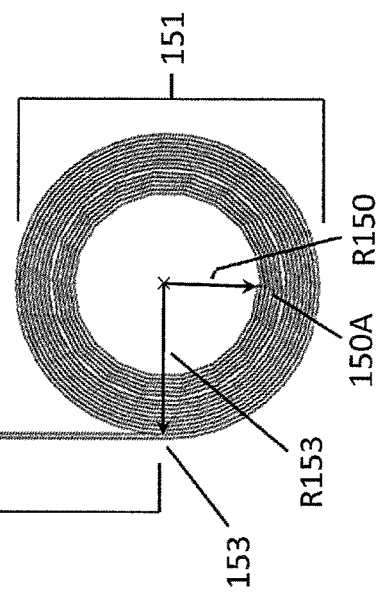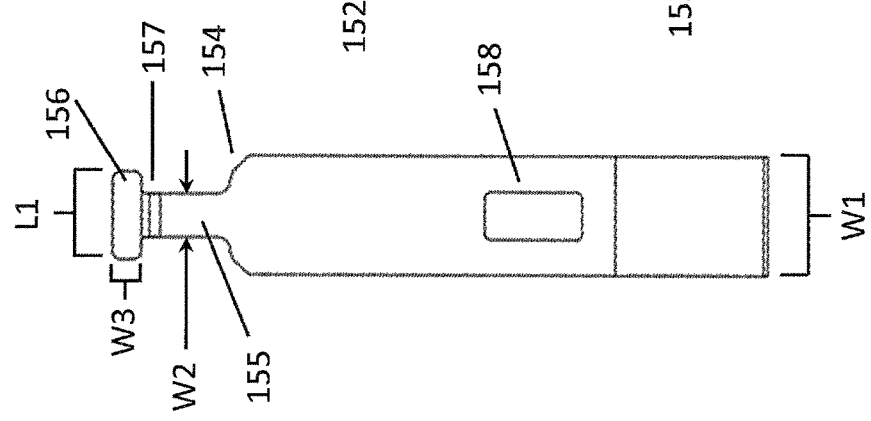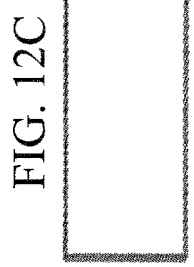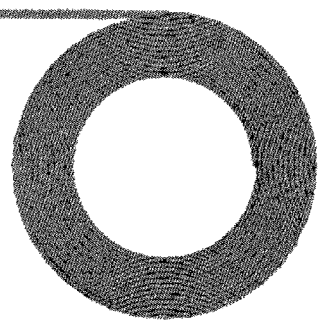

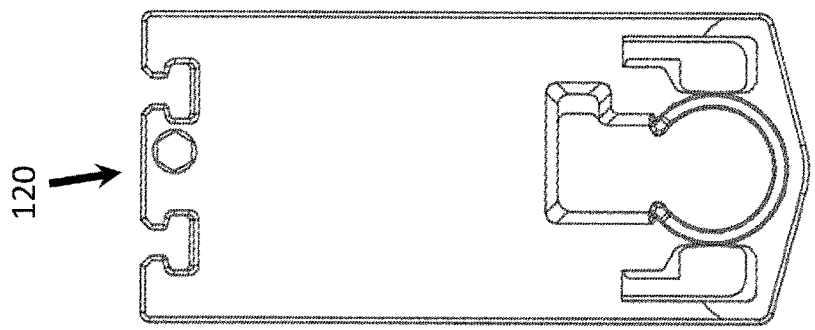
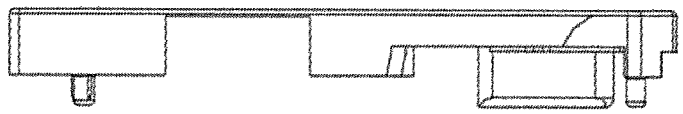
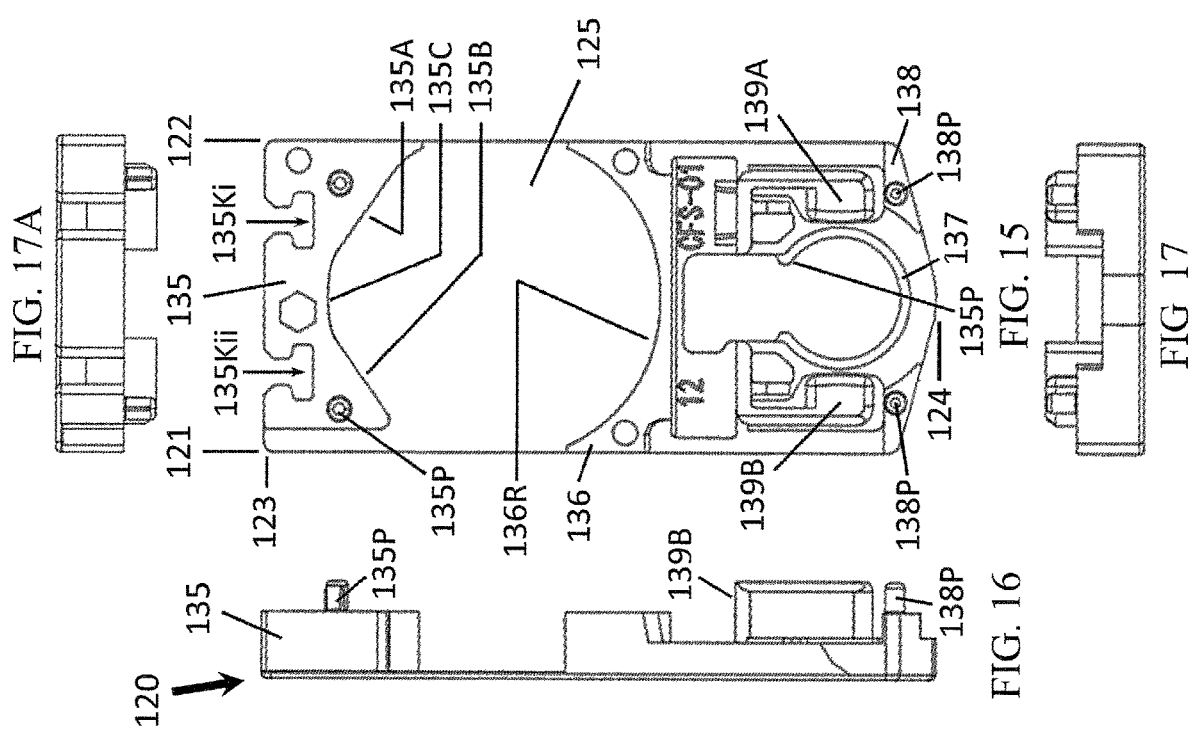

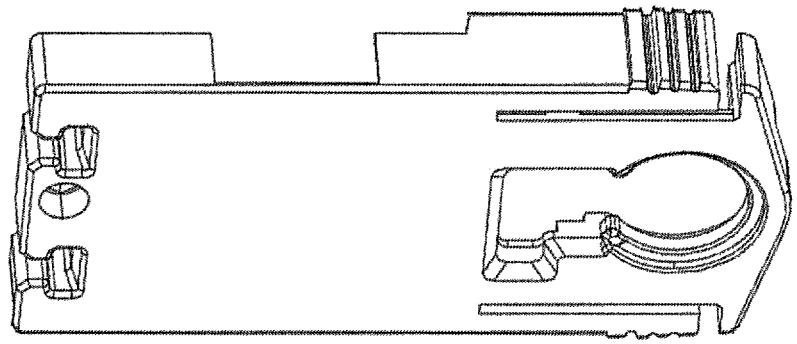
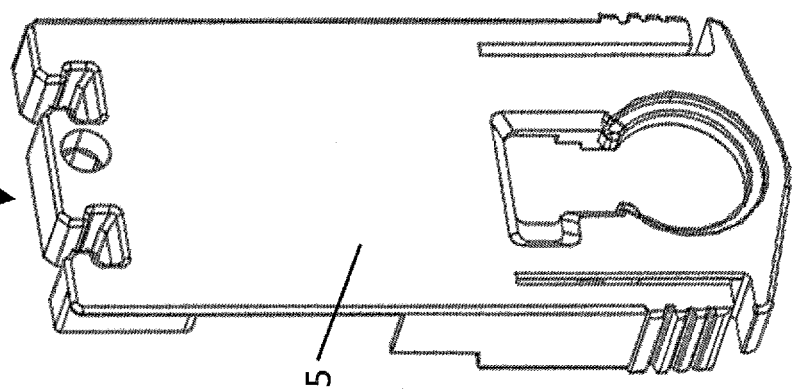
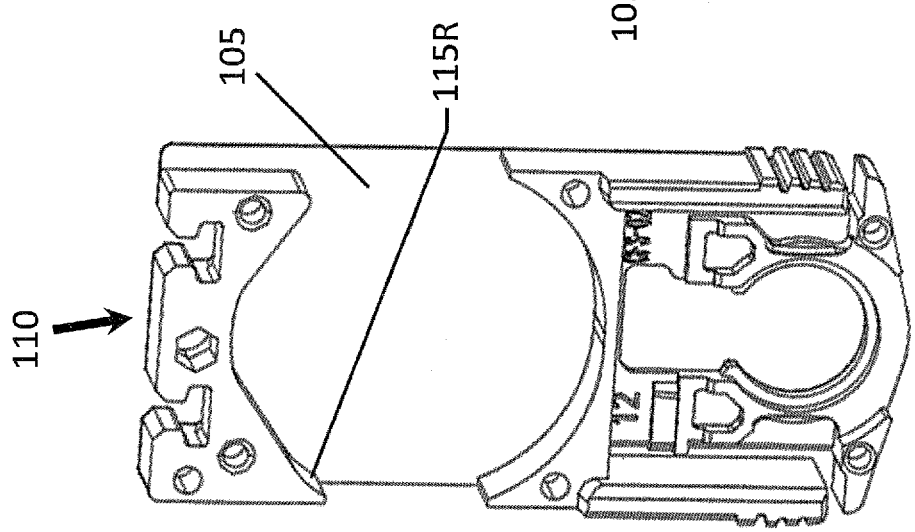
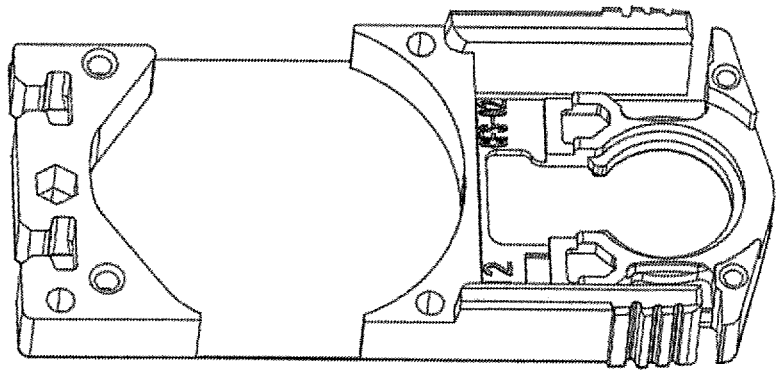

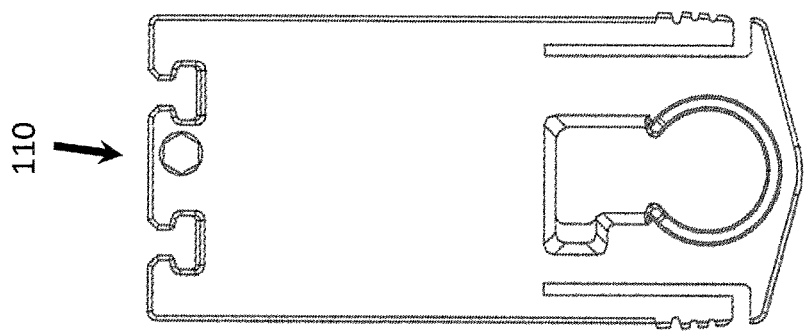
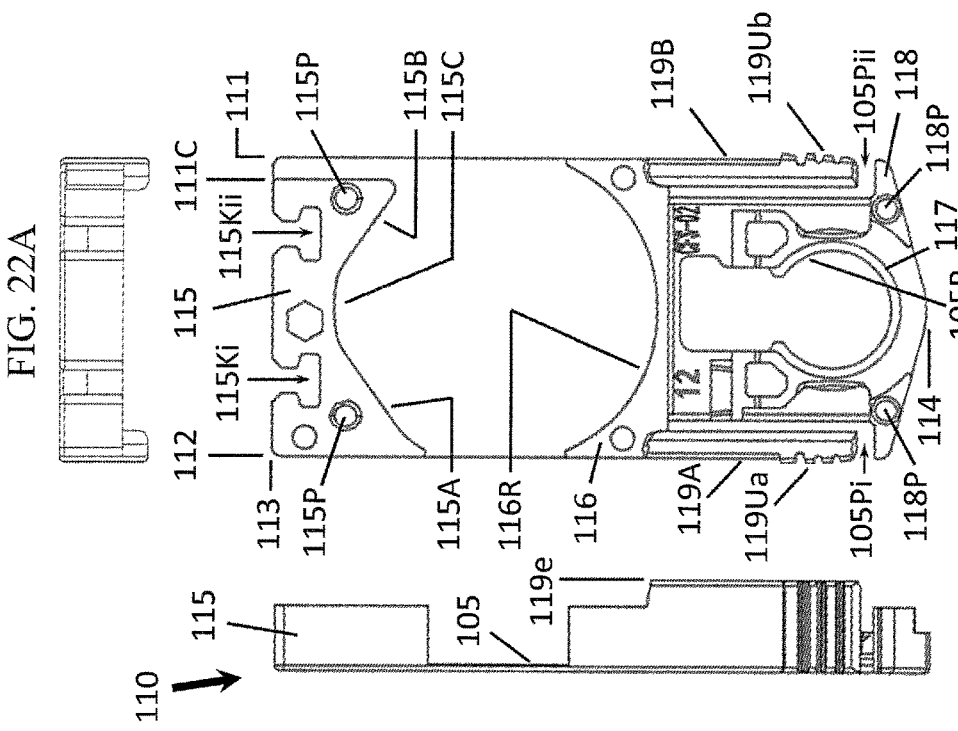

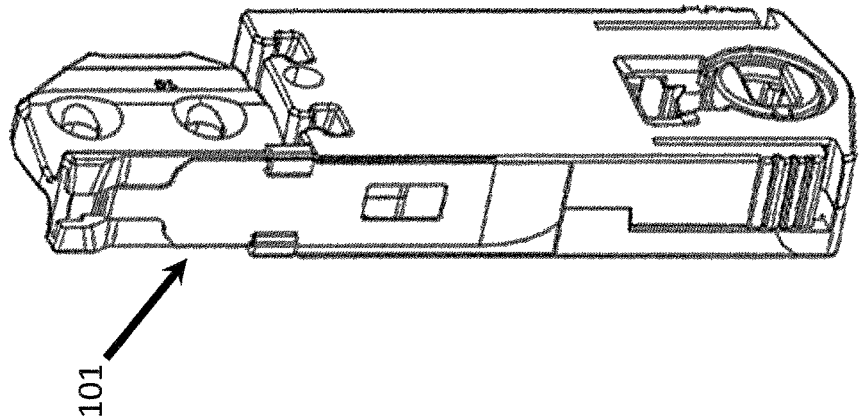
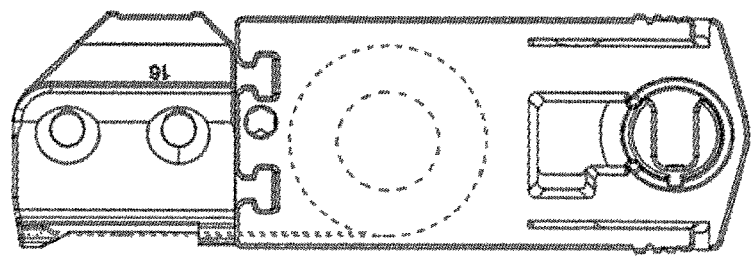
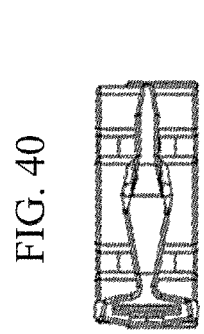
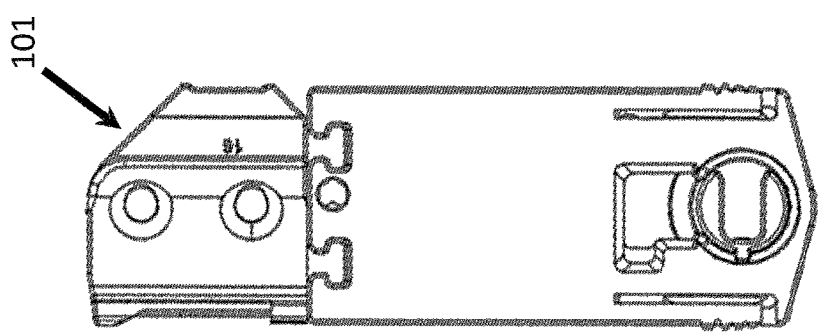
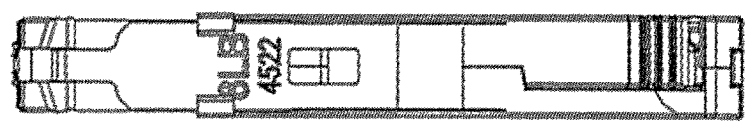

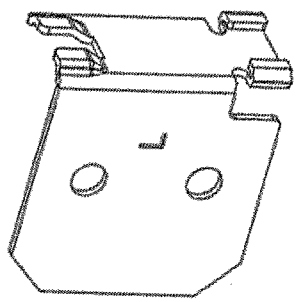
FIG. 41A
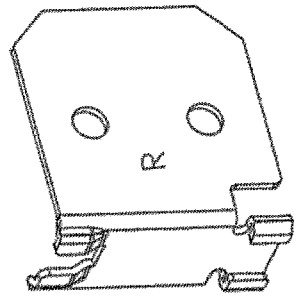
FIG. 41B
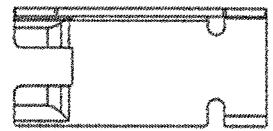
FIG. 44
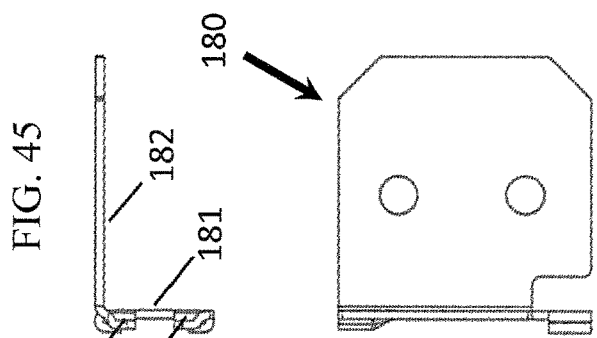
FIG. 45
FIG. 42
FIG. 46
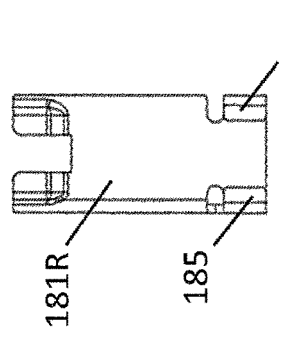
FIG. 43

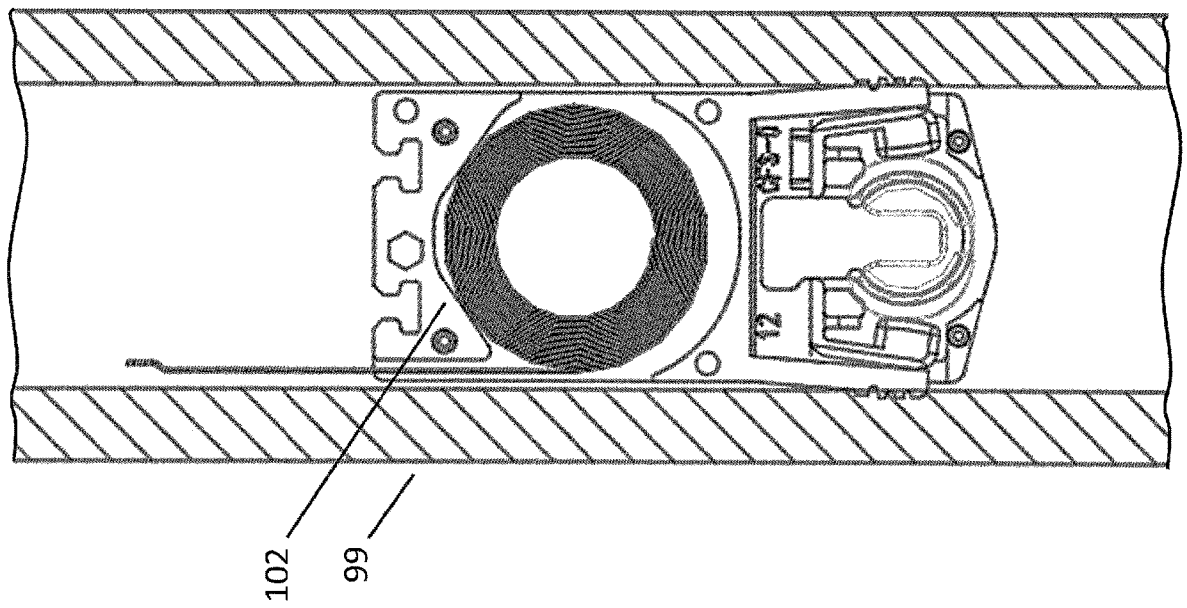

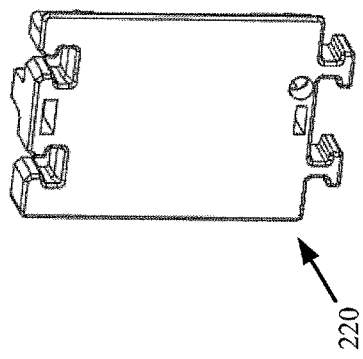
FIG. 50
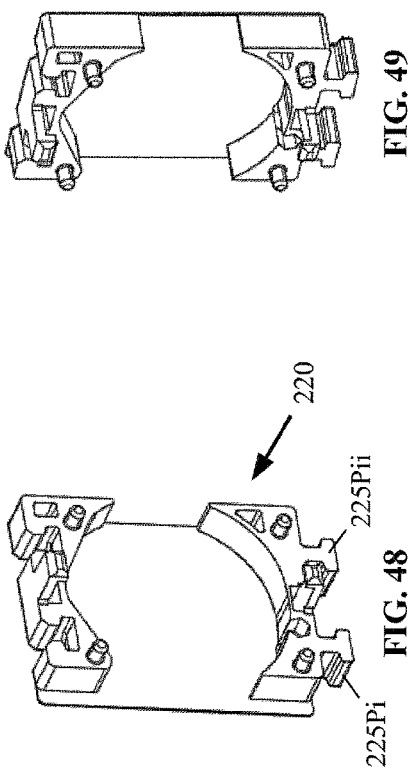
FIG. 49
FIG. 48
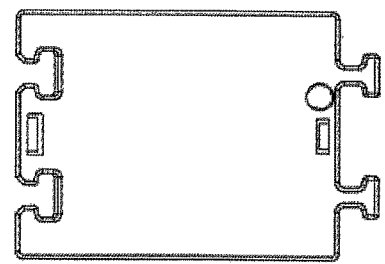
FIG. 55
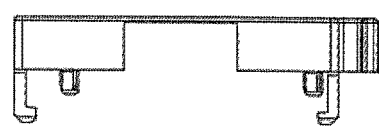
FIG. 54
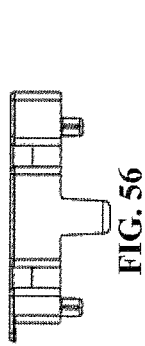
FIG. 56
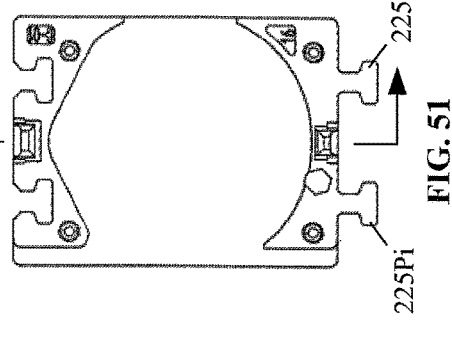
FIG. 51
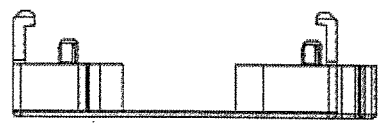
FIG. 52
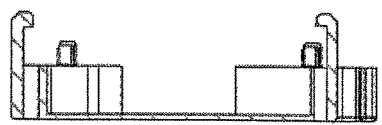
FIG. 53

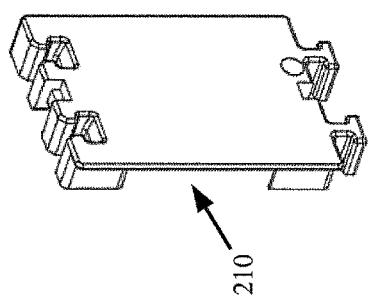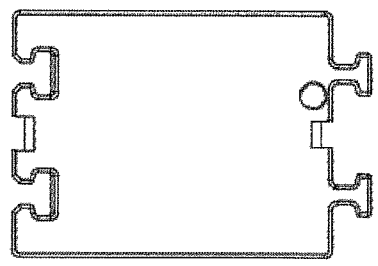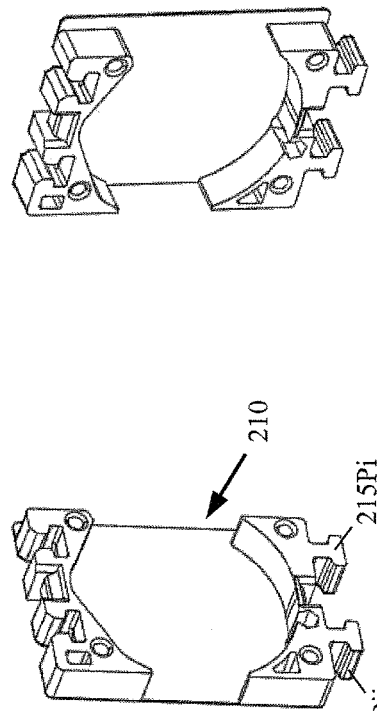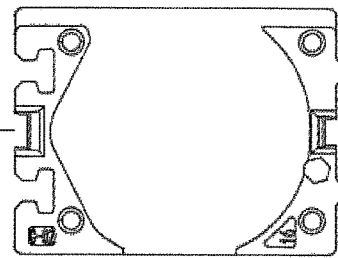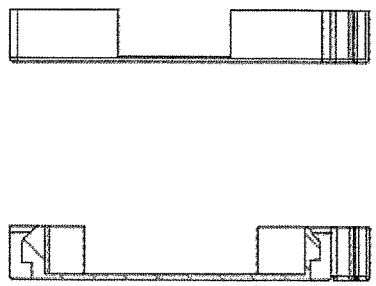

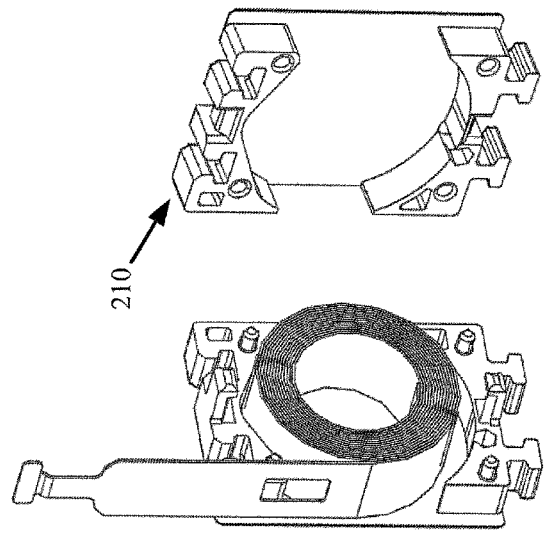
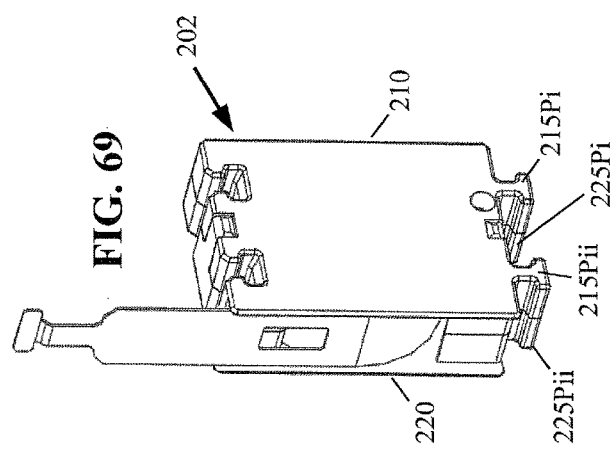
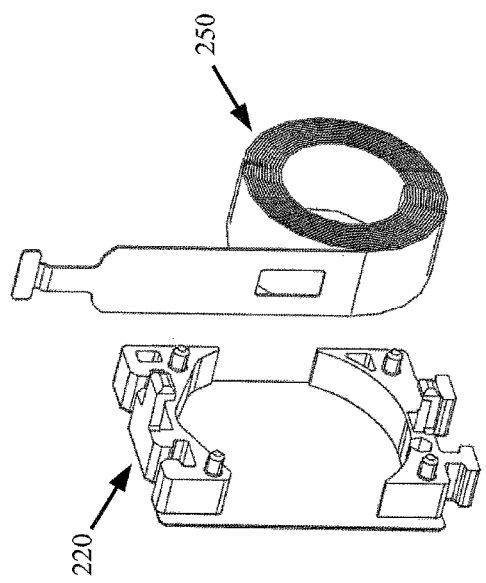
FIG. 68
FIG. 69
FIG. 67

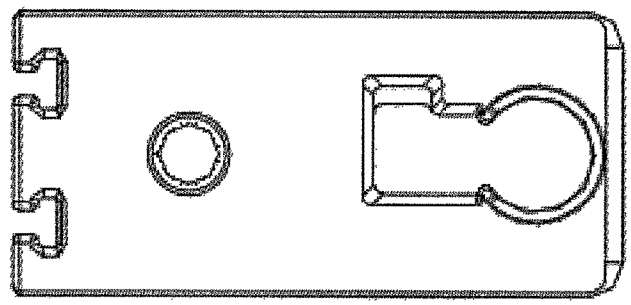
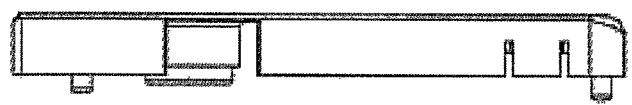
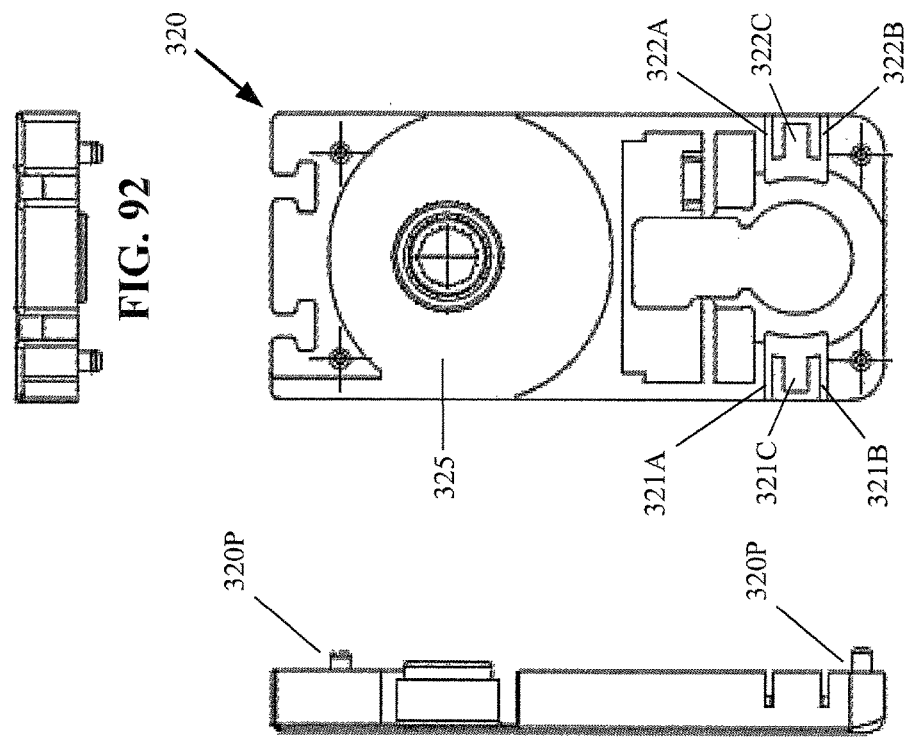
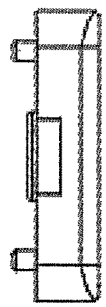

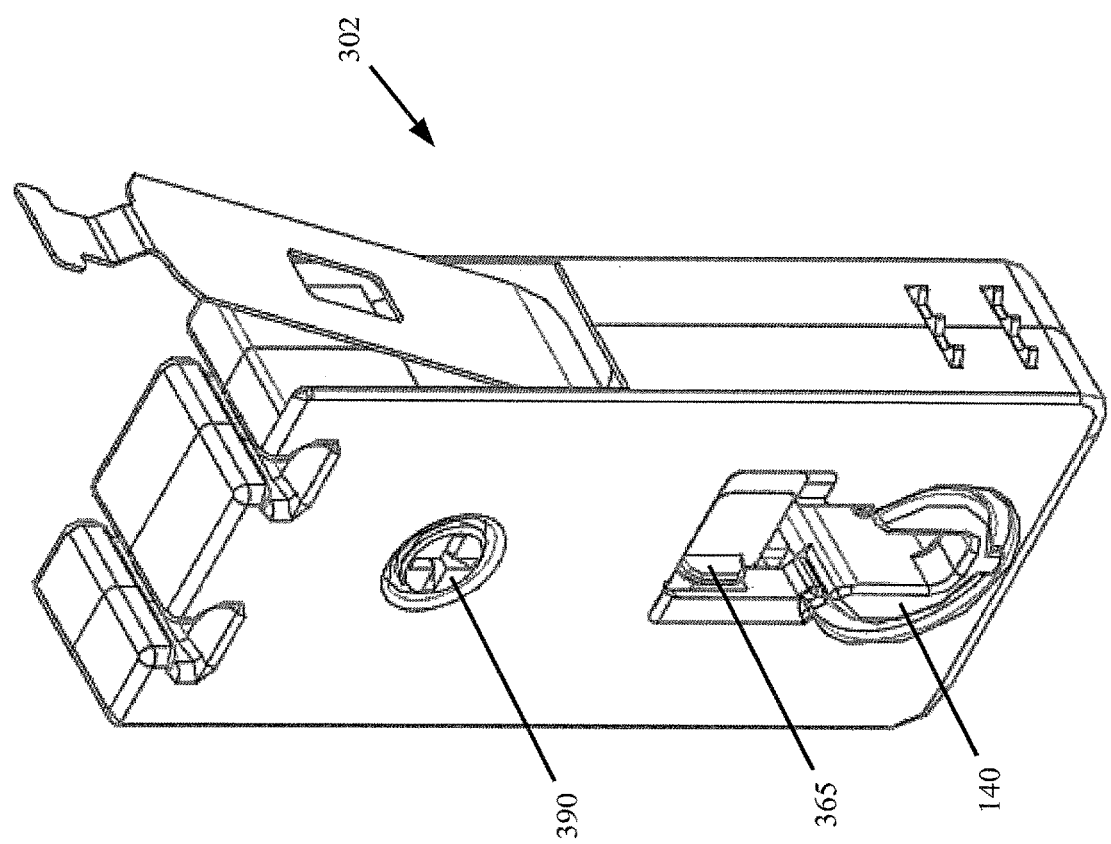

WINDOW BALANCE ASSEMBLY WITH IMPROVED BRAKE ARRANGEMENT

CROSS-REFERENCES

This application is a continuation-in-part of U.S. patent application Ser. No. 18/363,110, filed on Aug. 1, 2023, having the title "Window Balance Assembly with Improved Mounting Bracket and Curl Spring Attachment," which claims priority on U.S. Provisional Patent Application Ser. No. 63/514,159, filed on Jul. 18, 2023, having the title "Window Balance Shoe," all disclosures of which are incorporated herein by reference.

FIELD OF THE INVENTION

The present invention relates to an improved window balance system for a sliding sash window, and more particularly relates to an improved brake arrangement for the window balance system.

BACKGROUND OF THE INVENTION

Single hung and double hung sash windows are commonly used today in the construction of residential and commercial buildings. Sash locks are typically mounted to the meeting rail of the bottom sash window to lock the sash or sashes, by preventing the lower sash (or both the lower and upper sashes for a double hung window), from being opened through sliding movement relative to the master window frame.

To assist in the cleaning of the exterior of the glazing of the sash window, it may be constructed differently. Rather than the frame of the sash window itself being slidable within a track of the master window frame, a lower pivotal member on the sash window may slide in the track, and a pair of tilt latch devices mounted on an upper part of the window frame may also slide in the track of the master window frame. The tilt latches may be actuated to be withdrawn from the track to permit tilting of the sash window about the lower pivotal member into the room.

A window balance assembly has traditionally been used to apply a lifting force to counterbalance the weight of a sash window, so that it is easier to lift open by a user, and so that it does not slam shut in the downward direction once released by the user. Many different arrangements have been developed for a window balance assembly over the course of decades. To counterbalance the constant force of the weight of the window, curl springs were eventually utilized. A curl spring may generally apply a constant force to counterbalance the window's weight, as it may be formed of a length (i.e., a narrow strip) of spring steel (or other suitable material) that has been formed to normally curl up into a spiral shape having multiple convolutions, when no force is applied to it.

When a force is exerted to the outer end of the strip and the convolutions are uncurled and extended, each linear increment of the extended strip is biased to recurl itself and may thus exert a constant force against further extension of the spring.

However, these arrangements tend to be deficient with respect to the ease of the attachment of the tail of the curl spring to the mounting bracket. More importantly, the attachment of the tail of the curl spring to the mounting bracket of these arrangements tends to permit excessive movement of the curl spring at its end, which may raise frictional resistance through contact with the channel/track in which it is installed.

Balance Assemblies that may be related, and which are not admitted to be prior art to the herein disclosed invention, may be shown within the following U.S. Pat. No. 2,732,594 to Adams; U.S. Pat. No. 2,739,344 to Dickinson; U.S. Pat. No. 4,683,676 to Sterner; U.S. Pat. No. 4,718,194 to Fitz-Gibbon; U.S. Pat. No. 5,353,548 to Westfall; U.S. Pat. No. 5,661,927 to Polowinczak; U.S. Pat. No. 6,378,169 to Batten; U.S. Pat. No. 6,584,644 to Braid; U.S. Pat. No. 6,802,105 to Polowinczak; U.S. Pat. No. 6,983,513 to Pettit; U.S. Pat. No. 8,074,402 to Tuller; U.S. Pat. No. 8,561,260 to Baker; U.S. Pat. No. 9,133,656 to Steen; U.S. Pat. No. 10,053,899 to deNormand; and U.S. Pat. No. 11,352,821 to Kellum.

It is noted that the citing of any reference within this disclosure, i.e., any patents, published patent applications, and non-patent literature, is not an admission regarding a determination as to its availability as prior art with respect to the herein disclosed and claimed method/apparatus.

The herein disclosed apparatus provides improvements upon each balance assembly in the prior art.

OBJECTS OF THE INVENTION

It is an object of the invention to provide an improved balance assembly to counterbalance the weight of a sash window.

It is another object of the invention to provide an improved attachment arrangement for the tail of a curl spring to the mounting bracket of a sash window balance assembly.

It is a further object of the invention to provide an improved attachment arrangement that more easily facilitates securement of the tail of a curl spring with respect to the mounting bracket of a sash window balance assembly.

It is a further object of the invention to provide an improved attachment arrangement with respect to the tail of the curl spring and the mounting bracket of a sash window balance assembly that better restricts movement of the curl spring at its end, to thereby reduce frictional resistance through contact with the channel in which it is installed.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A window balance assembly disclosed herein includes a housing, a receiver, a curl spring, and a mounting bracket. The housing may be formed as a single unitary piece, or may alternatively be formed in two pieces. The housing may have protrusions that define a first interior space and a second interior space. The receiver may be rotatably supported in the first interior space of the housing and may be formed to include a cam surface. A first portion of the curl spring—consisting of the series of curled-up convolutions—may be disposed within the second interior space of the housing, which space may be generally cylindrical. A second portion of the curl spring is formed to be generally straight and thus does not curl as do the convolutions maintained in the second interior space; therefore, the second portion may extend out of the second interior space and out of the housing, where it may be secured to the mounting bracket. A distal end of the second portion of the curl spring includes a neck portion, and an elongated head portion. The elongated head portion is oriented transverse to the neck portion at a distal end of the neck portion.

The mounting bracket is formed to include a first flange and a second flange. The second flange may include one or more orifices that may be used to secure the bracket to the sash window. The first flange is particularly formed to provide for improved attachment characteristics with respect to the tail of the curl spring.

The first flange is formed to include a first guide member and a second guide member, each of which respectively protrude from first and second sides of a rear surface of the first flange, being positioned distally from the top of the mounting bracket. The first guide member and the second guide member are preferably formed to have a right angle cross-sectional shape, which right angles face each other and are spaced apart a particular distance, so that in combination, the two guide members may slidably receive and guide the coordinated width of the curl spring, and also maintain the second portion of the curl spring in close proximity to, or in contact with, the rear surface, when the curl spring slides due to movement of the sash window. The first flange is also formed to include a first ramp member and a second ramp member, each of which respectively protrude from the first and second sides of the rear surface of the first flange, being positioned near or at the top of the mounting bracket. Each of the first ramp member and second ramp member have a top surface that is formed to include a recess. The first ramp member and the second ramp member are spaced apart on the rear surface to form a gap that is particularly configured to permit sliding passage of the coordinated width of the neck of the curl spring between the two ramp members, when the neck is positioned in close proximity to the rear surface of the first flange. The ramp surfaces of the first ramp member and the second ramp member are each configured to divert (i.e., to deflect) opposing sides of the head away from the rear surface, when the second portion of said curl spring is manually advanced upwardly (i.e., is caused to slide) between the first guide member and the second guide member. The head (as well as the unrestrained second portion of the curl spring being above the two guide members) is so deflected until the head passes above and beyond the two ramp members, at which time the generally straight second portion of the curl spring will naturally return to being in proximity to (or in contact with) the rear surface of the first flange, with the neck then being positioned in the gap between the two ramp members. Once the manual force being applied to the second portion of the curl spring is removed, the curl spring will bias the spring to retract into the second interior space of the housing, until opposite sides of the head are respectively received into the recesses formed in the top surface of the two ramp members, with the neck being nested in the gap between the ramp members, and thereby temporarily maintaining the curl spring in a static position, which position may be subsequently altered after installation of the balance assembly and opening of the sliding sash window.

The first guide member and the second guide member, as well as the first ramp member and the second ramp member, may each be symmetrically formed on the rear surface of the first flange of the mounting bracket.

The housing may also be formed to include a first elongated tab and a second elongated tab, being positioned on opposite sides of the housing. The cam of the receiver is configured to cause the distal ends of the first elongated tab and second elongated tab to deflect outwardly, when the receiver is rotated from a first position to a second position as a result of the sash window being tilted.

BRIEF DESCRIPTION OF DRAWINGS

The description of the various example embodiments is explained in conjunction with the following appended drawings.

FIG. 1 is a perspective view of a first embodiment of a window balance assembly disclosed herein.

FIG. 2 is an exploded view showing the component parts of the window balance assembly of FIG. 1.

FIG. 3 is a first perspective view of the mounting bracket of the window balance assembly of FIG. 1.

FIG. 4 is a second perspective view of the mounting bracket of the window balance assembly of FIG. 1.

FIG. 5 is a side view of the mounting bracket of the window balance assembly of FIG. 1.

FIG. 6 is a top view of the mounting bracket of the window balance assembly of FIG. 1.

FIG. 7 is a bottom view of the mounting bracket of the window balance assembly of FIG. 1

FIG. 8 is a rear view of the mounting bracket of the window balance assembly of FIG. 1

FIG. 9 is a front view of the mounting bracket of the window balance assembly of FIG. 1

FIG. 11 is a first side view of the curl spring of the window balance assembly of FIG. 1.

FIG. 11A is a second side view of the curl spring of the window balance assembly of FIG. 1.

FIG. 12 is a rear view of the curl spring of the window balance assembly of FIG. 1.

FIG. 12A is a front view of the curl spring of the window balance assembly of FIG. 1.

FIG. 12B is a bottom view of the curl spring of the window balance assembly of FIG. 1.

FIG. 12C a top view of the curl spring of the window balance assembly of FIG. 1.

FIG. 15 is a first side view of the first housing portion of the window balance assembly of FIG. 1.

FIG. 15A is a second side view of the first housing portion of the window balance assembly of FIG. 1.

FIG. 16 is a first end view of the first housing portion of the window balance assembly of FIG. 1.

FIG. 16A is a second end view of the first housing portion of the window balance assembly of FIG. 1.

FIG. 17 is a bottom view of the first housing portion of the window balance assembly of FIG. 1.

FIG. 17A is a top view of the first housing portion of the window balance assembly of FIG. 1.

FIG. 18 is a first perspective view of the exterior of a second housing portion of the window balance assembly of FIG. 1.

FIG. 18A is a second perspective view of the exterior of the second housing portion of the window balance assembly of FIG. 1.

FIG. 19 is a first perspective view of the interior of the second housing portion of the window balance assembly of FIG. 1.

FIG. 19A is a second perspective view of the interior of the second housing portion of the window balance assembly of FIG. 1.

FIG. 20 is a first side view of the second housing portion of the window balance assembly of FIG. 1.

FIG. 20A is a second side view of the second housing portion of the window balance assembly of FIG. 1.

FIG. 21 is a first end view of the second housing portion of the window balance assembly of FIG. 1.

FIG. 21A is a second end view of the second housing portion of the window balance assembly of FIG. 1.

FIG. 22 is a bottom view of the second housing portion of the window balance assembly of FIG. 1.

FIG. 22A is a top view of the second housing portion of the window balance assembly of FIG. 1.

FIG. 36 is the perspective view of the balance assembly of FIG. 1 shown enlarged.

FIG. 37 is a transparent side view of the balance assembly of FIG. 36.

FIG. 38 is a side view of the balance assembly of FIG. 36.

FIG. 39 is an end view of the balance assembly of FIG. 36.

FIG. 40 is a top view of the balance assembly of FIG. 36.

FIG. 41A is a first perspective view of an installation clip usable with the balance assembly of FIG. 1.

FIG. 41B is a second perspective view of an installation clip usable with the balance assembly of FIG. 1.

FIG. 42 is a side view of the installation clip of FIG. 41A.

FIG. 43 is a first end view of the installation clip of FIG. 41A.

FIG. 44 is a second end view of the installation clip of FIG. 41A.

FIG. 45 is a top view of the installation clip of FIG. 41A.

FIG. 46 is a bottom view of the installation clip of FIG. 41A.

FIG. 47 shows a cross-sectional view through a portion of a master window frame having the balance assembly of FIG. 29 positioned therein, being shown with the receiver having been rotated to from a first position to a second position, whereat the first cam of the receiver causes the first cantilevered protrusion of the second housing portion to deform outwardly in a first direction and thereby cause the first cantilevered protrusion of the first housing portion to also deform outwardly in the first direction to engage a first interior wall of the master window frame, and the second cam of the receiver causes the second cantilevered protrusion of the second housing portion to deform outwardly in a second direction and thereby causes the second cantilevered protrusion of the first housing portion to also deform outwardly in the second direction to engage a second interior wall of the master window frame.

FIG. 48 is a first perspective view of a first housing portion usable for a companion balance shoe assembly.

FIG. 49 is a second perspective view of the first housing portion shown in FIG. 48.

FIG. 50 is a third perspective view of the first housing portion shown in FIG. 48.

FIG. 51 is a first side view of the first housing portion shown in FIG. 48.

FIG. 52 is a first end view of the of the first housing portion shown in FIG. 48.

FIG. 53 is cross-sectional view through the first housing portion shown in FIG. 48.

FIG. 54 is a second end view of the first housing portion shown in FIG. 48.

FIG. 55 is a second side view of the first housing portion shown in FIG. 48.

FIG. 56 is a top view of the first housing portion shown in FIG. 48.

FIG. 57 is a first perspective view of a second housing portion usable for a companion balance shoe assembly.

FIG. 58 is a second perspective view of the second housing portion shown in FIG. 57.

FIG. 59 is a third perspective view of the second housing portion shown in FIG. 57.

FIG. 60 is a first side view of the second housing portion shown in FIG. 57.

FIG. 61 is a first end view of the second housing portion shown in FIG. 57.

FIG. 62 is cross-sectional view through the second housing portion shown in FIG. 57.

FIG. 63 is a second end view of the second housing portion shown in FIG. 57.

FIG. 64 is a second side view of the second housing portion shown in FIG. 57.

FIG. 65 is a top view of the second housing portion shown in FIG. 57.

FIG. 66 is a bottom view of the second housing portion shown in FIG. 57.

FIG. 67 is a perspective view showing the first housing portion of FIG. 48 just prior to the curl spring being received therein.

FIG. 68 is the perspective view of FIG. 67, but shown after the curl spring is received in the first housing portion, and just prior to coupling of the second housing portion to the first housing portion.

FIG. 69 is the perspective view of FIG. 68, but is shown just after coupling of the second housing portion to the first housing portion.

FIG. 87 is a first side view of the first housing portion of FIG. 83.

FIG. 88 is a first end view of the first housing portion of FIG. 83.

FIG. 89 is a second end view of the first housing portion of FIG. 83.

FIG. 90 is a second side view of the first housing portion of FIG. 83.

FIG. 91 is a bottom view of the first housing portion of FIG. 83.

FIG. 92 is a top view of the first housing portion of FIG. 83.

FIG. 106 is a side view of the blocking plate of FIG. 102.

FIG. 107 is a left end view of the blocking plate of FIG. 102.

FIG. 108 is a right end view of the blocking plate of FIG. 102.

FIG. 109 is a bottom view of the of the blocking plate of FIG. 102.

FIG. 110 is a top view of the of the blocking plate of FIG. 102.

Figure 83:
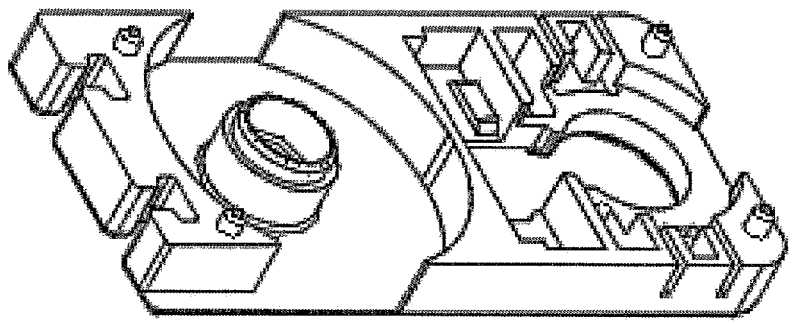
Figure 95:
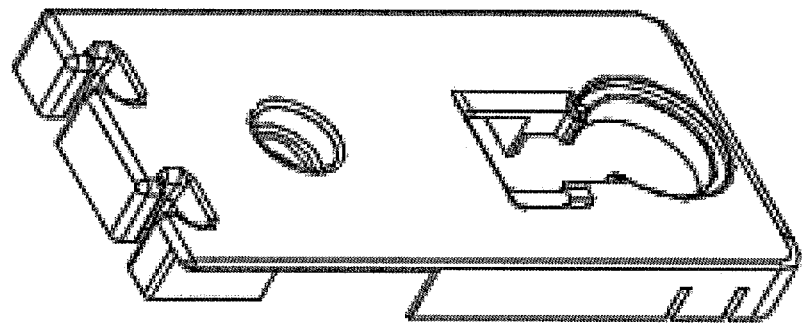
FIG. 93, FIG. 94, and FIG. 95 are first, second, and third perspective views of another embodiment of a second housing portion that is usable in conjunction with the first housing portion of FIG. 83 for forming another primary balance shoe assembly.
Figure 94:
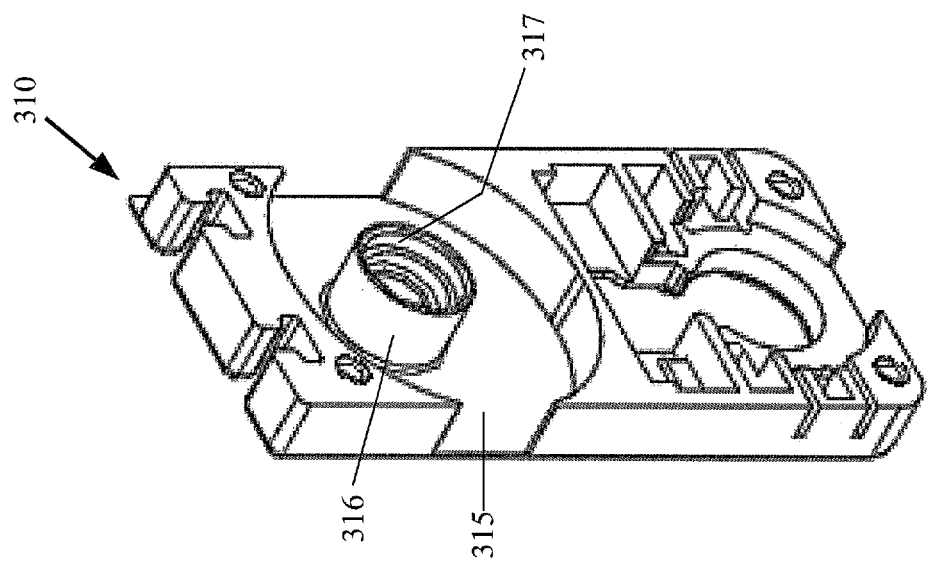
Figure 93:
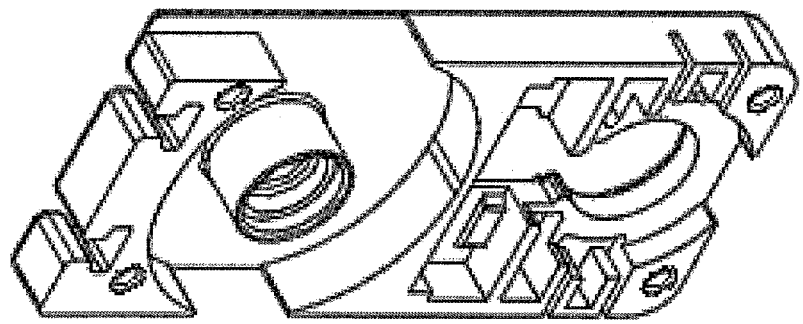
Figure 99:
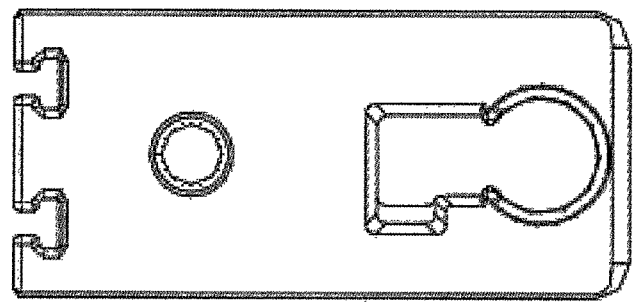
FIG. 99 is a second side view of the second housing portion of FIG. 93.
Figure 98:
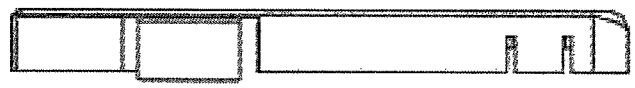
FIG. 98 is a second end view of the second housing portion of FIG. 93.
Figure 101:
FIG. 101 is a top view of the second housing portion of FIG. 93.
Figure 102:
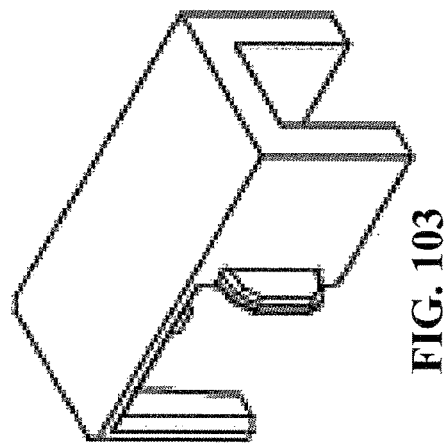
FIG. 102, FIG. 103, FIG. 104, and FIG. 105 are first, second, third, and fourth perspective views of a blocking plate usable in conjunction with the first and second housing portions of FIG. 83 and FIG. 93 for forming another primary balance shoe assembly.
Figure 103:
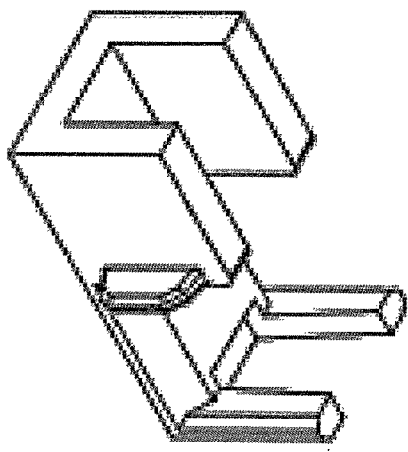
Figure 104:
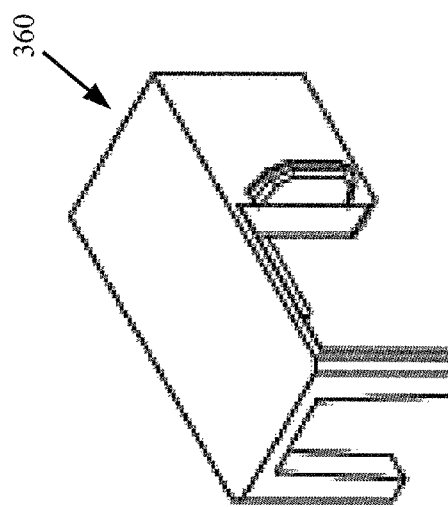
Figure 105:
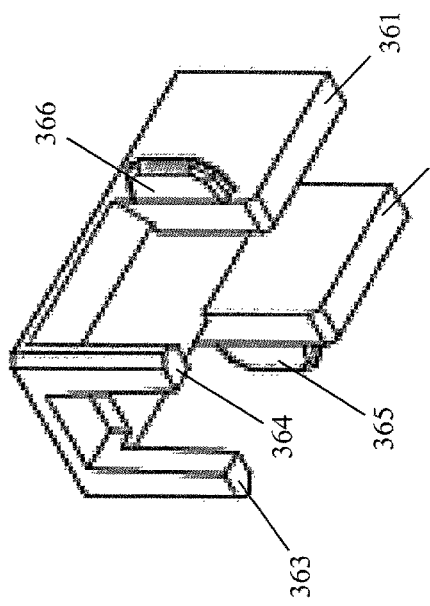
Figure 108:
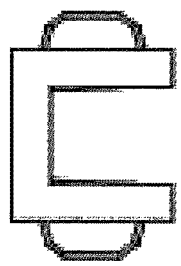
Figure 110:
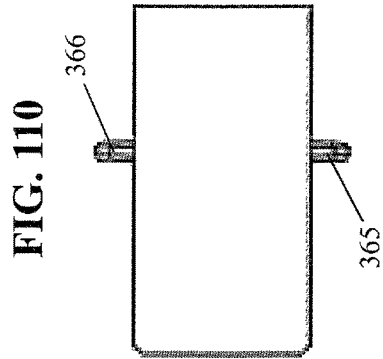
Figure 106:
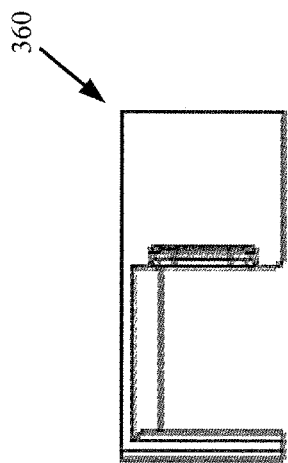
Figure 109:
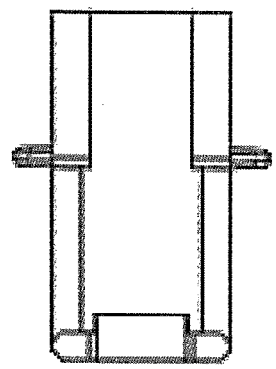
Figure 107:
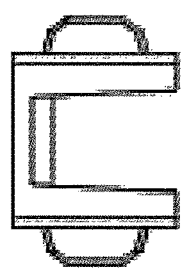
Figure 114:
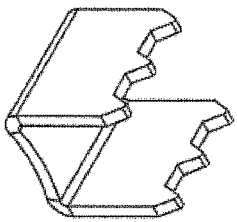
Figure 113:
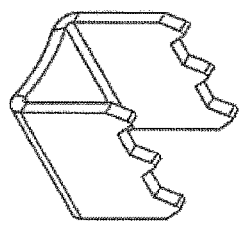

FIG. 111, FIG. 112, FIG. 113, and FIG. 114 are first, second, third, and fourth perspective views of a braking plate usable in conjunction with the first and second housing portions of FIG. 83 and FIG. 93, and the blocking plate of FIG. 102 for forming another primary balance shoe assembly.

Figure 115:
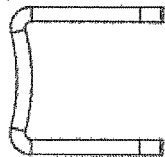
Figure 111:
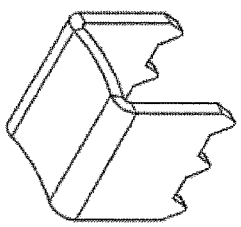

FIG. 115 is a side view of the braking plate of FIG. 111.

Figure 116:
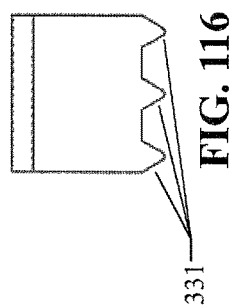

FIG. 116 is a left end view of the braking plate of FIG. 111.

Figure 117:
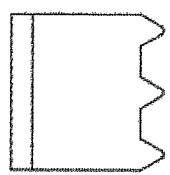

FIG. 117 is a right end view of the braking plate of FIG. 111.

Figure 118:
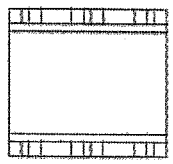
Figure 112:
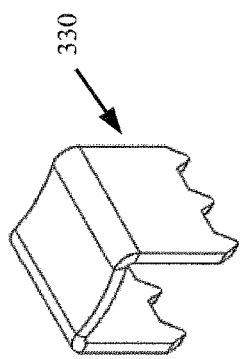

FIG. 118 is a bottom view of the of the braking plate of FIG. 111.

Figure 119:
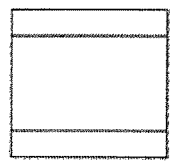

FIG. 119 is a top view of the of the braking plate of FIG. 111.

Figure 120:
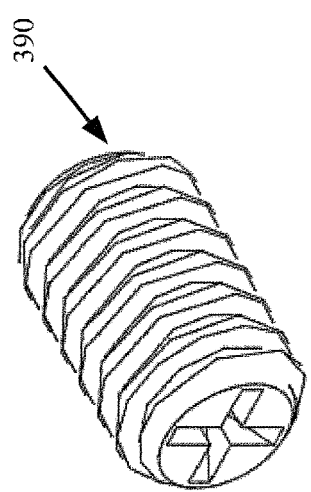

FIG. 120 is a perspective view of an adjusting screw usable in conjunction with the first and second housing portions of FIG. 83 and FIG. 93, the blocking plate of FIG. 102, and the braking plate of FIG. 111, for forming another primary balance shoe assembly.

Figure 121:
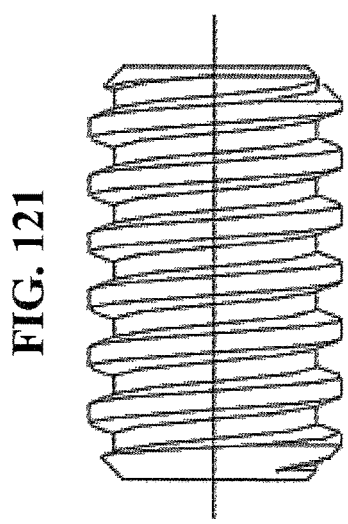

FIG. 121 is a side view of the adjusting screw of FIG. 120.

Figure 122:
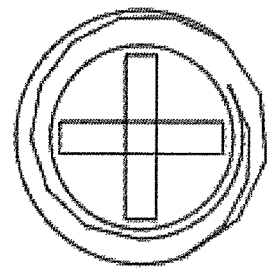

FIG. 122 is an end view of the adjusting screw of FIG. 120.

Figure 123:
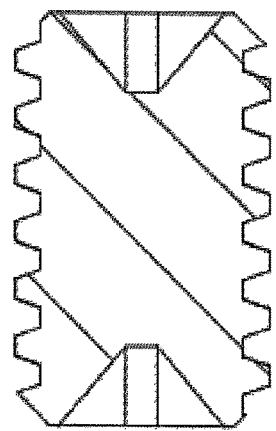

FIG. 123 is a cross-sectional view through the adjusting screw of FIG. 120.

Figure 124:
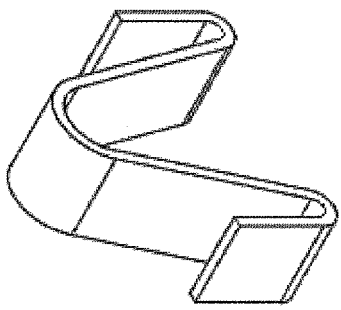
Figure 125:
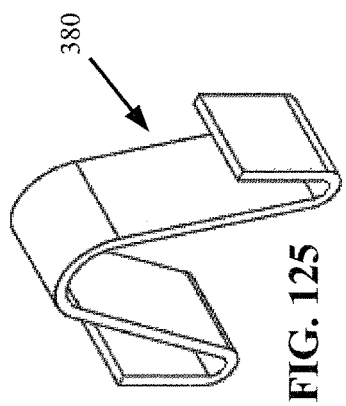
Figure 126:
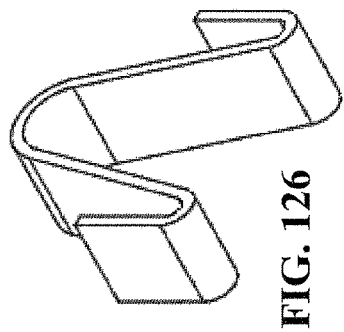

FIG. 124, FIG. 125, and FIG. 126 are first, second, and third perspective views of a leaf spring usable in conjunction with the first and second housing portions of FIG. 83 and FIG. 93, the blocking plate of FIG. 102, the braking plate of FIG. 111, and the adjusting screw of 120 for forming another primary balance shoe assembly.

Figure 127:
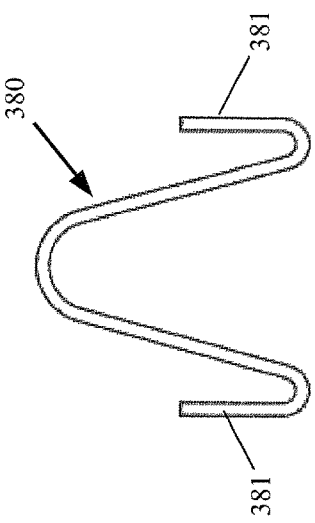

FIG. 127 is a side view of the leaf spring of FIG. 124.

Figure 128:
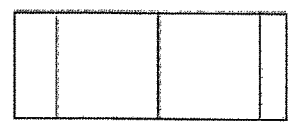

FIG. 128 is a first end view of the leaf spring of FIG. 124.

Figure 129:
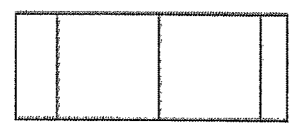

FIG. 129 is a second end view of the leaf spring of FIG. 124.

Figure 130:

FIG. 130 is a top view of the leaf spring of FIG. 124.

Figure 131:
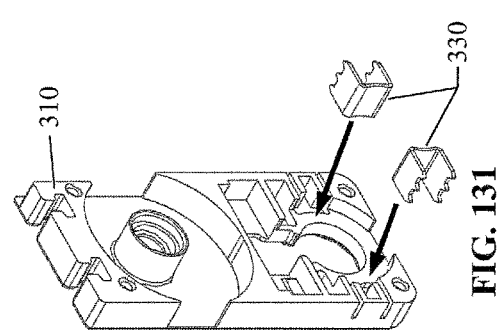

FIG. 131 is a perspective view showing the first housing portion of FIG. 83 just prior to first and second braking plates as seen in FIG. 111 being installed therein.

Figure 132:
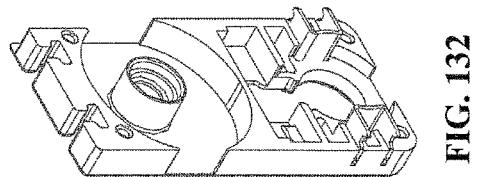

FIG. 132 is the perspective view of FIG. 131, but shown after the first and second braking plates have been installed in the first housing portion.

Figure 133:
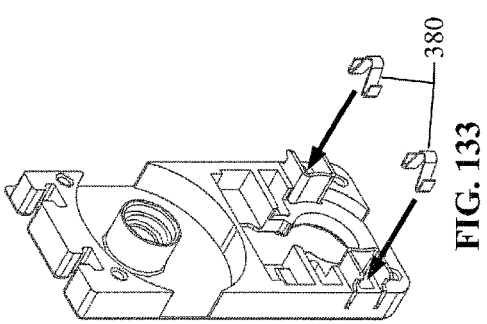

FIG. 133 is the perspective view of FIG. 132, but shown just prior to first and second leaf springs as seen in FIG. 124 being installed in the first housing portion.

Figure 134:
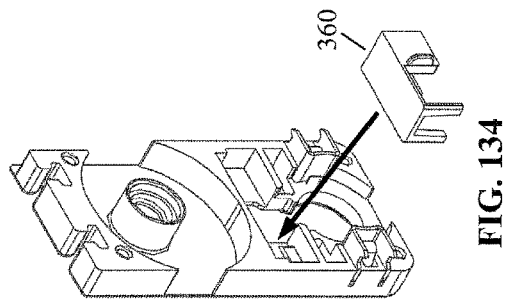

FIG. 134 is the perspective view of FIG. 133, but shown just prior to the blocking plate as seen in FIG. 102 being installed in the first housing portion.

Figure 135:
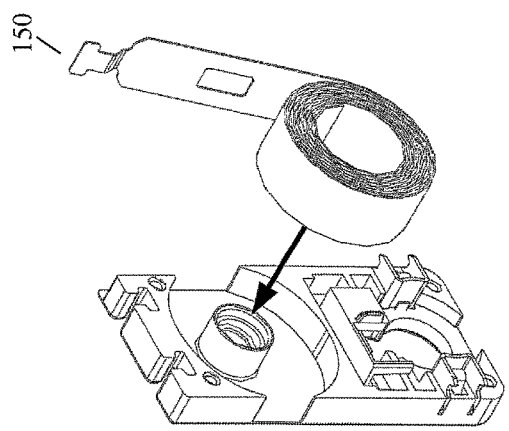

FIG. 135 is the perspective view of FIG. 134, but shown just after the blocking plate has been installed in the first housing portion and just prior to the curl spring being installed in the first housing portion.

Figure 135A:
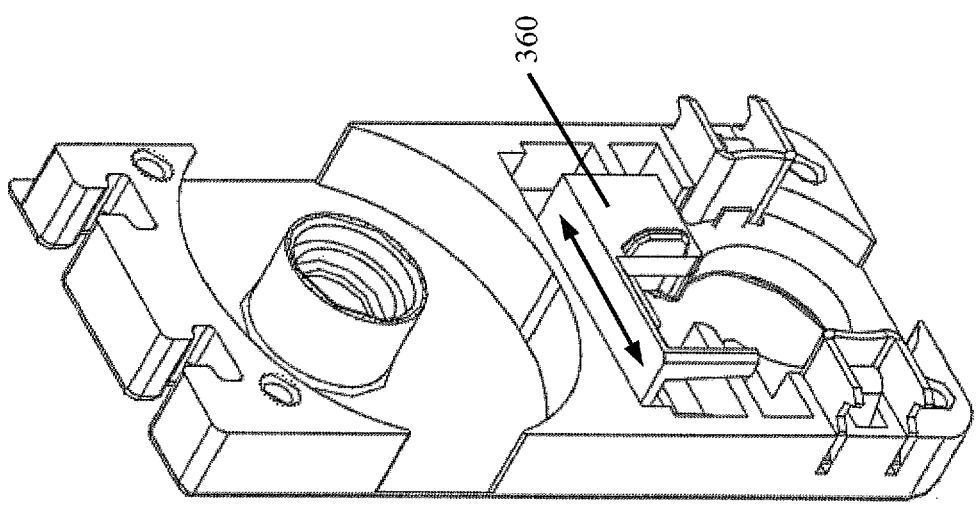

FIG. 135A is the perspective view of FIG. 135, but is shown enlarged, and without the curl spring.

Figure 136:
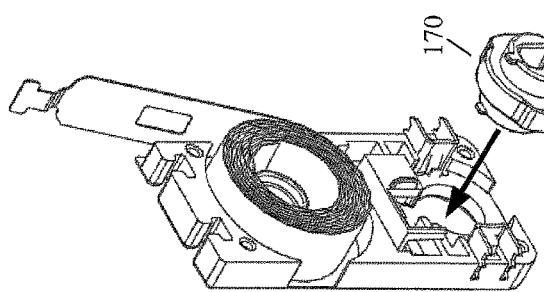

FIG. 136 is the perspective view of FIG. 135, but shown just after the curl spring has been installed in the first housing portion, and just prior to the receiver being installed in the first housing portion.

Figure 137:
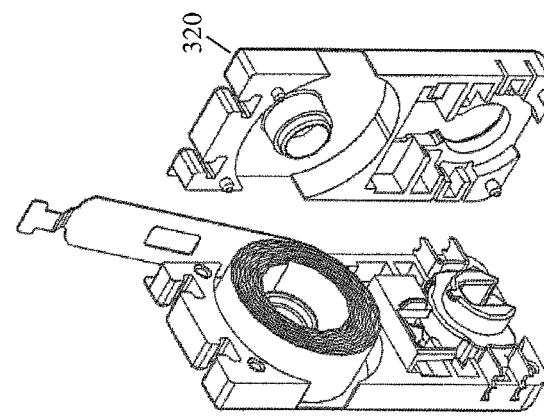

FIG. 137 is the perspective view of FIG. 136, but shown just after the receiver has been installed in the first housing portion, and just prior to the second housing portion being secured to the first housing portion.

Figure 138:
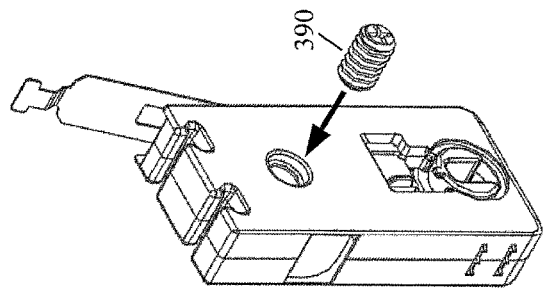

FIG. 138 is the perspective view of FIG. 137, but shown just after the second housing portion has been secured to the first housing portion, and just prior to the adjustment screw being threadably coupled to the first and second housing portions.

FIG. 139 is the perspective view of FIG. 138, but shown just after the adjustment screw has been threadably coupled to the first and second housing portions to form the primary balance shoe assembly.

Figure 140:
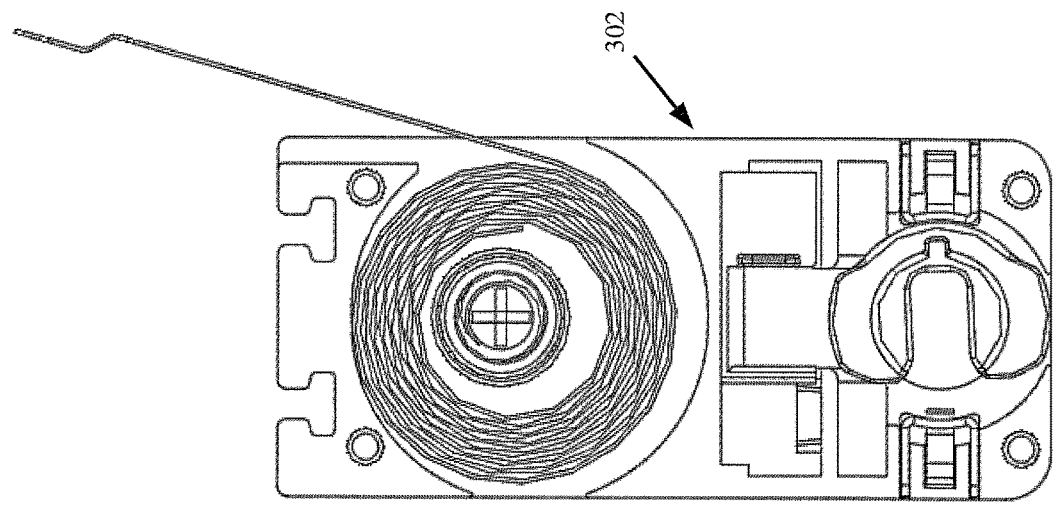

FIG. 140 is a cross-sectional view though the primary balance shoe assembly of FIG. 139, shown with the receiver in a first position.

Figure 73:
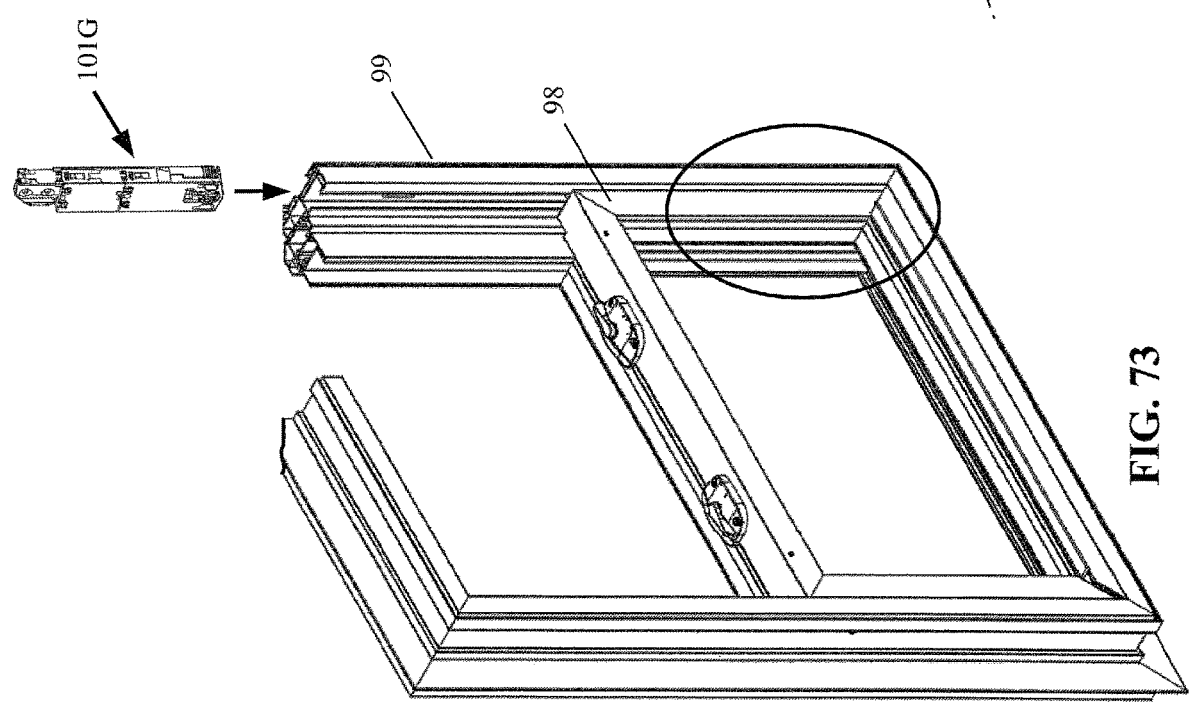
FIG. 73 is a perspective view of a sliding sash window installed in a master window frame, with a portion of the master window frame cut away to show an interior channel into which may be installed the assembled balance shoe assembly, companion balance shoe assembly, and mounting bracket of FIG. 72.
Figure 141:
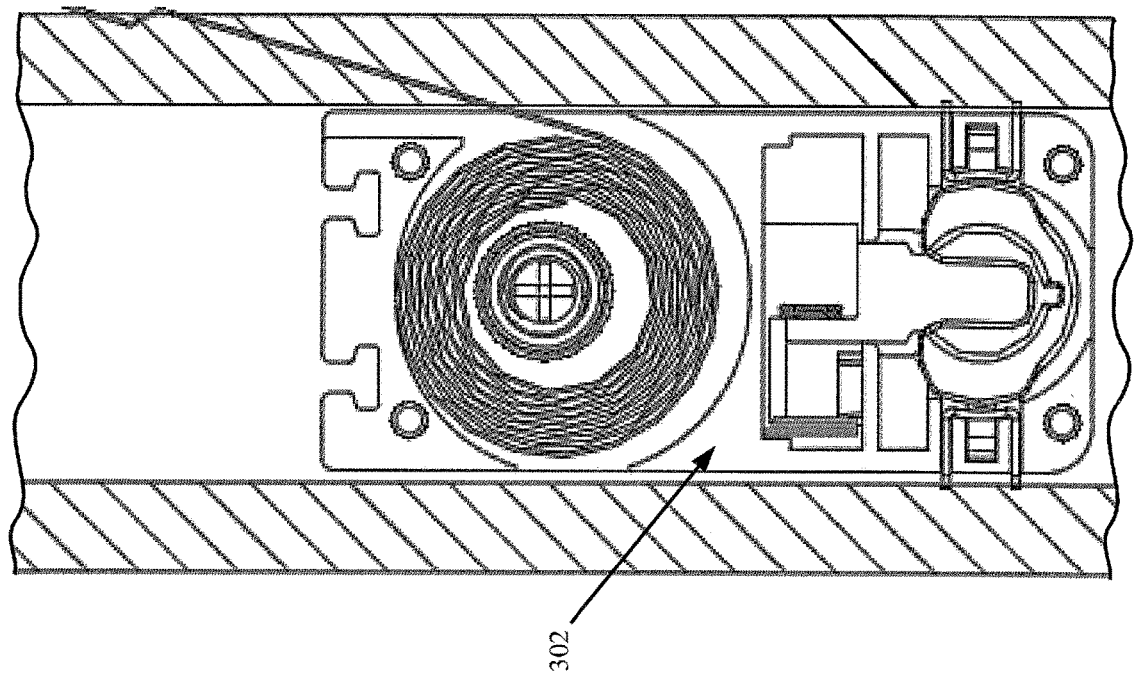

FIG. 141 is a cross-sectional view though the primary balance shoe assembly of FIG. 139, shown installed within the master window frame of FIG. 73, with the receiver rotated into a second position to cause deployment and engagement of the first and second braking members with first and second interior walls of the master window frame.

Figure 142:
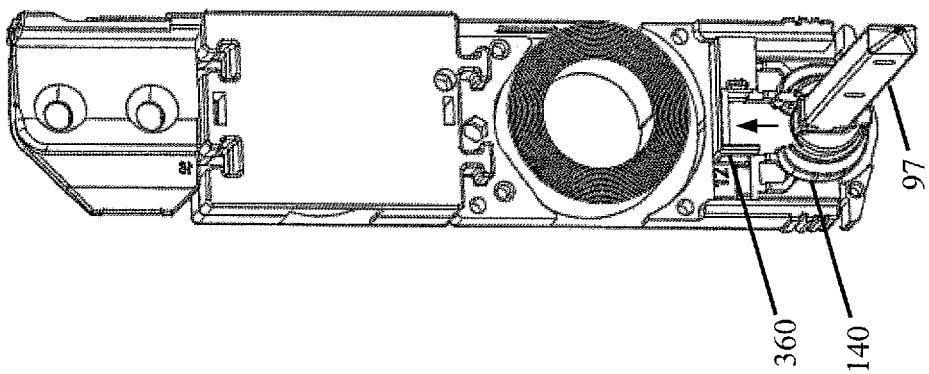

FIG. 142 is a perspective view of the primary balance shoe assembly of FIG. 139, shown with one of the housing portions removed, and with the blocking plate in a position that permits sliding movement of the pivot pin relative to the keyway of the receiver to facilitate its removal.

Figure 143:
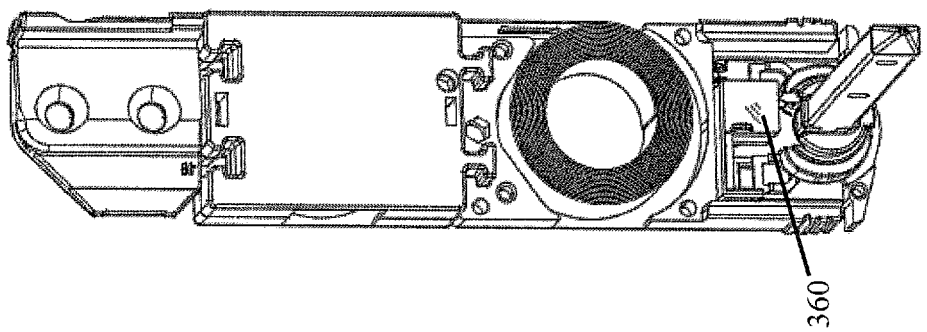

FIG. 143 is the perspective view of FIG. 142, but where the blocking plate has been slid into a position that inhibits movement of the pivot pin relative to the keyway of the receiver to prevent its removal.

Figure 144:
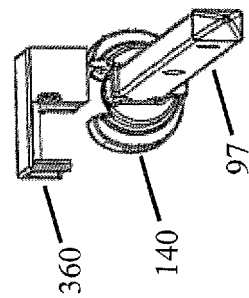

FIG. 144 is an enlarged detail view of the blocking plate, the receiver, and the pivot pin, as seen in FIG. 143.

DETAILED DESCRIPTION OF THE INVENTION

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole/recess) is larger than the part received therein (e.g., a shaft/protrusion), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: en.wikipedia.org/wiki/Engineering_fit; and "Three General Types of Fit," available at mmto.org.

FIG. 1 shows a perspective view of a window balance assembly 101. FIG. 2 shows an exploded view of the component parts used to form the window balance assembly 101 of FIG. 1, which may include a curl spring 150, a receiver 140, a mounting bracket 170, and a housing. The housing may be formed as a single unitary part, into which the components may be installed, or alternatively, as seen in FIG. 2, it may be more advantageous from a part manufacturing standpoint and an assembly/component installation standpoint for the housing to be formed into two separate parts that may be joined together, i.e., a first housing portion 110 and a second housing portion 120.

These component parts are first individually described within the following paragraphs, after which a description of the assembly of those parts and the operation of the window balance assembly 101 is then provided.

As seen in FIGS. 3-9, the mounting bracket 170 is formed to include a first flange 171 and a second flange 172. The mounting bracket 170 may be formed of any suitable material including, but not limited to, a metallic material, a plastic material, a wood material, a composite material (e.g., fiberglass, carbon fiber . . . ), etc. The first flange 171 and the second flange 172 may be formed at a ninety-degree angle to each other. Also, each of the first flange 171 and the second flange 172 may be formed to have a rectangular cross-sectional shape, or may alternatively be formed to have draft angles, such as when formed by an extruding process or a casting process. Additionally, or alternatively, one or both of the flanges 171/172 may have sculpted surfaces that may be tailored to provide required strength and stiffness only where needed (e.g., varying thinner and thicker flanges), and may also be thicker as needed to support particular features (e.g., the apertures).

For example, as seen in FIG. 7, the second flange 172 may have a smaller thickness at its base 173, i.e., in proximity to the first flange 171, and its thickness may taper (increase) to a maximum thickness 172T proximate to its middle section. A pair of apertures 172Ai and 172Aii may be formed in the second flange 172, and the axis of each of the apertures 172Ai and 172Aii may be formed at a non-ninety-degree angle to the mid-plane 172MP of the second flange 172.

The first flange 171 may be formed with features that may accommodate a unique and improved coupling of the curl spring 150 to the mounting bracket 170.

The first flange 171, as seen in FIG. 8, may be formed with a first guide member 174 that may protrude from a first side of a rear surface 171R of the first flange, which rear surface may be positioned opposite to the surface at which the second flange 172 protrudes. The first flange 171 may also be formed with a second guide member 175 that may protrude from a second side of the rear surface 171R of the first flange 171. Each of the first guide member 174 and the second guide member 175 may be generally L-shaped, each having short outstanding legs that protrude perpendicularly away from the rear surface 171R, with the inside-facing surfaces of the outstanding legs of the two L-shapes being spaced apart a distance D1 (FIG. 3) that may be just slightly larger than the width W1 of the curl spring (see FIG. 12), creating a slight clearance for the curl spring to slide/fit therebetween. A second set of legs respectively extend laterally from those outstanding legs to form the L-shape of the first and second guide members 174 and 175. The laterally extending legs of the L-shape may be parallel to, and spaced apart from, the rear surface 171R, forming respective gap dimensions 174G and 175G, which gaps may be the same. (Note that where the mounting bracket is formed as a casting or an extrusion, the interior surfaces of the outstanding legs and the laterally extending legs may nonetheless be perpendicular to and parallel to the rear surface 171R, respectively, while the exterior surfaces may have draft). The gap dimension 174G and the gap dimension 175G (FIG. 7) may be the same, and each may be formed to be slightly smaller than the thickness 150T of the curl spring (FIG. 11), creating a slight friction fit that would always keep at least a portion of the curl spring 150 in positive contact with the rear surface 171R of the first flange 171. Alternatively, the gap dimension 174G and the gap dimension 175G may be formed to be slightly larger than the thickness of the curl spring, creating a clearance fit that would keep the curl spring 150 in proximity to, but not necessarily in contact with, the rear surface 171R of the first flange 171. The degree of proximity may correlate to the amount of clearance that is used, which may be a loose running fit, a free running fit, a close running fit, or a sliding fit, the dimensions and tolerances of which are known in the art of designing such fits for sliding parts.

The first flange 171 may also be formed with a first ramp member 176 that may protrude from the first side of the rear surface 171R of the first flange, and a second ramp member 177 that may protrude from the second side of the rear surface 171R. Each of the first ramp member 176 and the second ramp member 177 may include an angled surface (e.g., surface 176A) that is configured to be at an obtuse angle θ with respect to the rear surface, as seen in FIG. 5. The angle θ may be in the range of about 135 degrees to 145 degrees in one embodiment, or may be in the range of about 145 degrees to 155 degrees in yet another embodiment, or may be in the range of about 155 degrees to 160 degrees in another embodiment, or may be in the range of about 160 degrees to 170 degrees in yet a different embodiment, or a combination of such ranges or other ranges may alternatively be used in other embodiments.

The first ramp member 176 and the second ramp member 177 are spaced apart a distance D2 to form a gap configured to permit passage of the neck portion 155 of the curl spring 150 within the gap, i.e., the gap distance D2 (FIG. 8) is slightly larger than the width W2 of the neck portion 155 of the curl spring 150 (FIG. 12). A recess 176R may be formed in the top of the first ramp member 176, and a recess 177R may be formed in the top of the second ramp member 177. As may be seen in FIG. 8, the first ramp member 176 and the second ramp member 177 may be positioned at one end (i.e., the "upper" end) of the rear surface 171R, and the first guide member 174 and second guide member 175 may be positioned at the opposite end (i.e., the "lower" end) of the rear surface 171R. As seen in FIG. 8, the first and second ramp members 176 and 177, and the first and second guide members 174 and 175 may be positioned at the four quadrants of the rear surface 171R, i.e., the upper left and right quadrants, and the lower left and right quadrants. It is noted that other sizes for the rear surface may alternatively be used, so that the ramp members and the guide members may not be positioned at the extreme outermost quadrants of the rear surface. However, the first and second ramp members 176 and 177, which may be positioned at the same distance along the axis 171Rax of the rear surface 171 (i.e., at the same height as seen in FIG. 8), are also preferably positioned a distance D3 away from the first guide member 174 and second guide member 175.

As seen in FIGS. 10-12C, the curl spring 150 has a first end 150A and a second end 150B, and is formed into a first portion 151 and a second portion 152. The curl spring 150 is formed of a length of a narrow strip of a suitable resilient material (e.g., spring steel), having a width W1 that is much smaller than the length used for the strip. The first portion 151 of the curl spring 150, which begins at the first end 150A, is formed to normally curl up into a spiral shape having a plurality of convolutions, when no force is applied to it, with the first end 150A being disposed within, and positioned at the start of, the plurality of convolutions. The plurality of convolutions may have a radius of curvature R150 at the end 150A, which radius, in one embodiment, may be on the order of about 9-10 mm (⅜th of an inch), but may vary according to the requirements of a particular sash window. In one embodiment, there may be about 12-14 convolutions; however, the number of convolutions may be coordinated with the radius of curvature used, the width W1 and thickness 150T of the strip of material, as well as the overall size of the housing 110/120, and each may be selected and coordinated as needed to accommodate balancing of a window having a particular size and weight, and the amount of travel of the sash window. The second portion 152 of the curl spring 150 may be formed to be substantially straight, and may extend from the last convolution at a tangency point 153, where the end of the last convolution may have a radius of curvature of R153 at that tangent point. The curl spring 150, proximate to the second end 150B, may be formed to transition at 154 into a neck portion 155, which may have a width W2 that may be centrally positioned with respect to the overall width W1 of the strip of material used to form the curl spring. The neck portion 155 may transition into an elongated head portion 156, with the elongated head portion being oriented transverse (i.e., at ninety degrees) to the neck portion, having a length Li and a width W3. The length Li of the head portion 156 may be centrally positioned with respect to the overall width W1 of the strip of material used to form the curl spring. The neck portion 155 may transition into the head portion 156 via a sheet metal joggle 157. The second portion 152 of the curl spring 150 may also be formed to include an opening 158 that may be generally rectangular, and which may be centrally positioned with respect to the overall width W1 of the strip of material used to form the curl spring.

Figure 10:
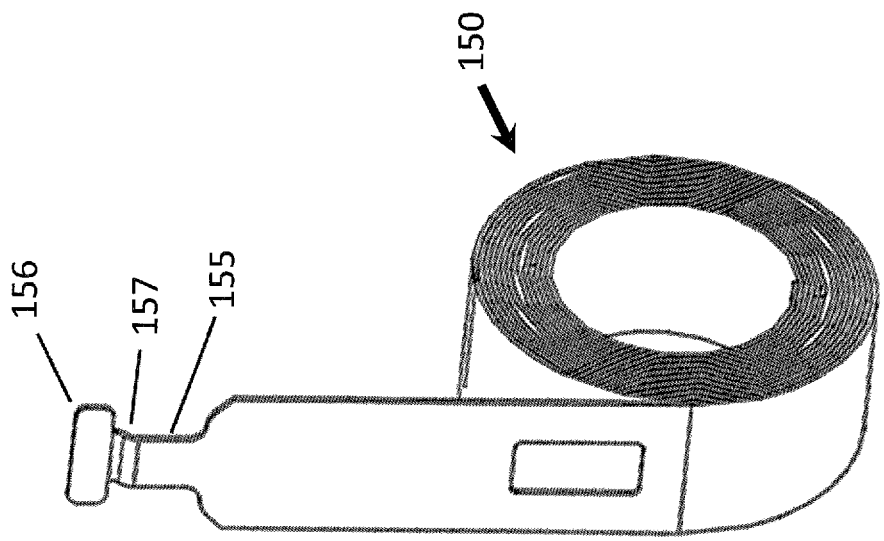
FIG. 10 is a first perspective view of the curl spring of the window balance assembly of FIG. 1.
Figure 10A:
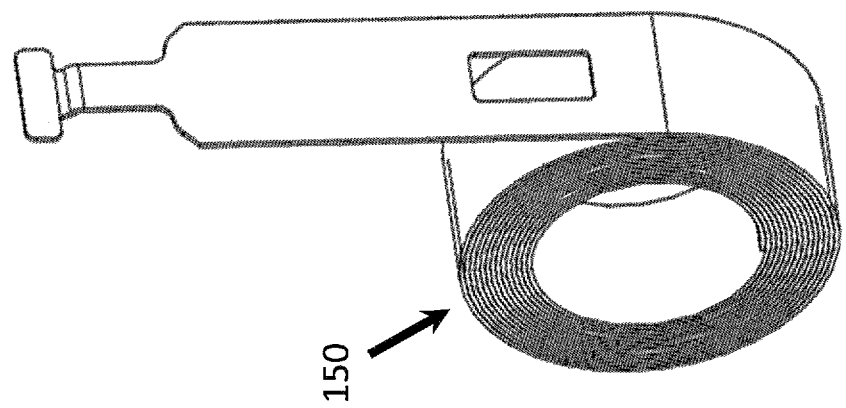
FIG. 10A is a second perspective view of the curl spring of the window balance assembly of FIG. 1.
Figure 13A:
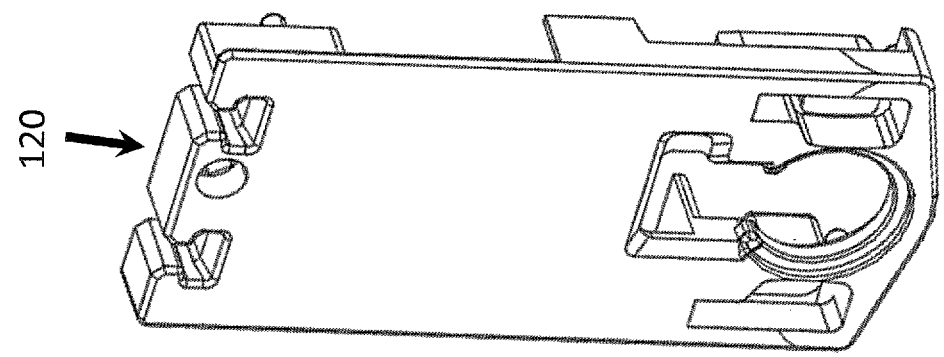
FIG. 13A is a second perspective view of the exterior of the first housing portion of the window balance assembly of FIG. 1.
Figure 13:
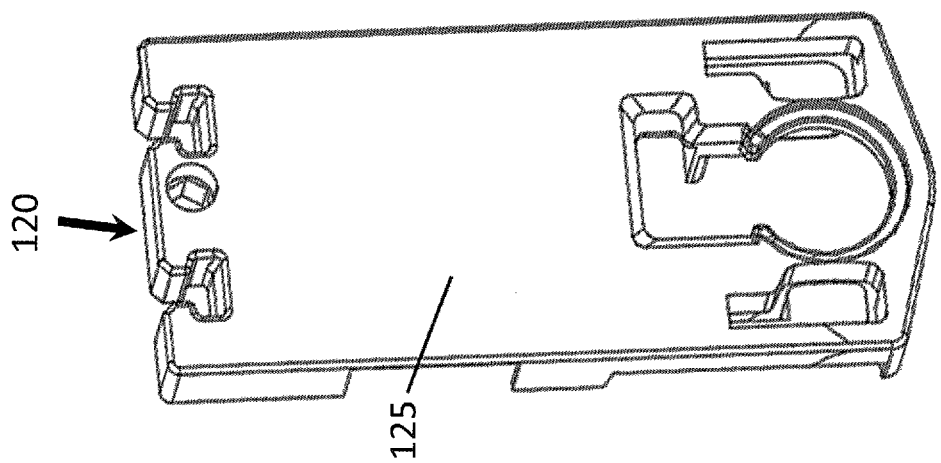
FIG. 13 is a first perspective view of the exterior of a first housing portion of the window balance assembly of FIG. 1.
Figure 14:
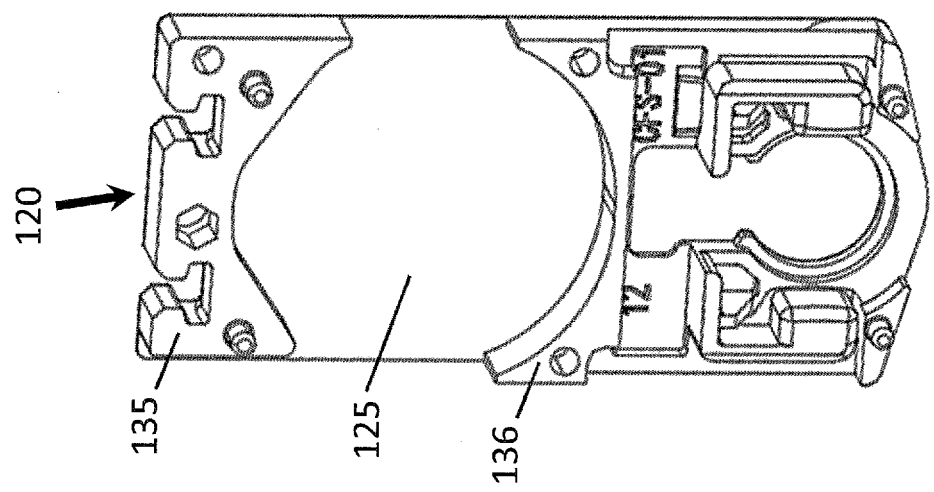
FIG. 14 is a first perspective view of the interior of the first housing portion of the window balance assembly of FIG. 1.
Figure 14A:
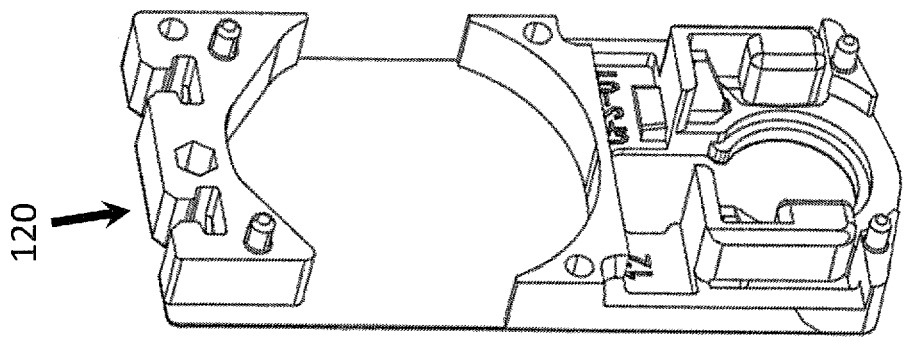
FIG. 14A is a second perspective view of the interior of the first housing portion of the window balance assembly of FIG. 1.
Figure 23:
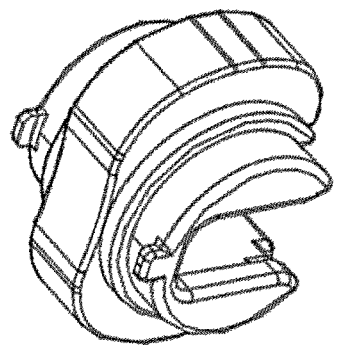
FIG. 23 is a first perspective view of the receiver of the window balance assembly of FIG. 1.
Figure 24:
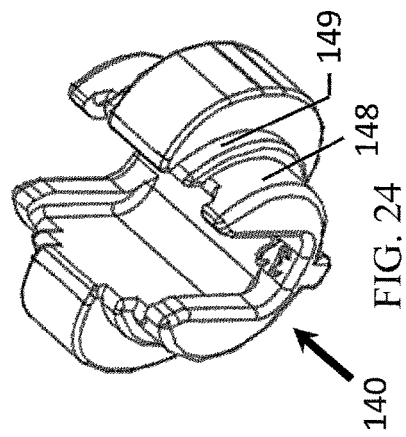
FIG. 24 is a second perspective view of the receiver of the window balance assembly of FIG. 1.
Figure 27:
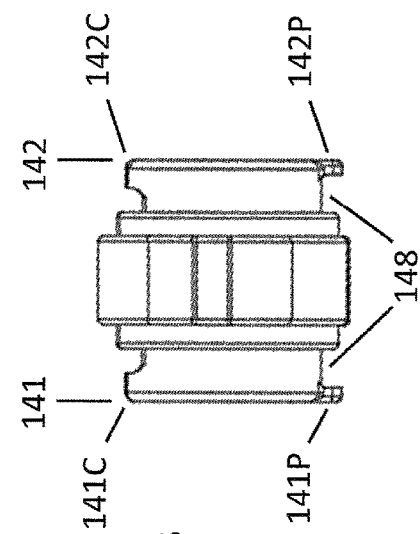
FIG. 27 is an end view of the receiver of the window balance assembly of FIG. 1.
Figure 25:
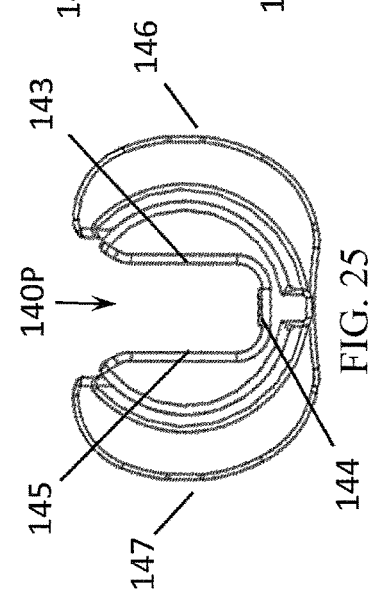
FIG. 25 is a side view of the receiver of the window balance assembly of FIG. 1.
Figure 26A:
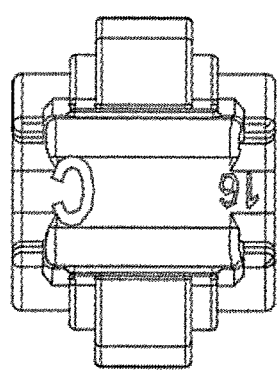
FIG. 26A is a top view of the receiver of the window balance assembly of FIG. 1.
Figure 26:
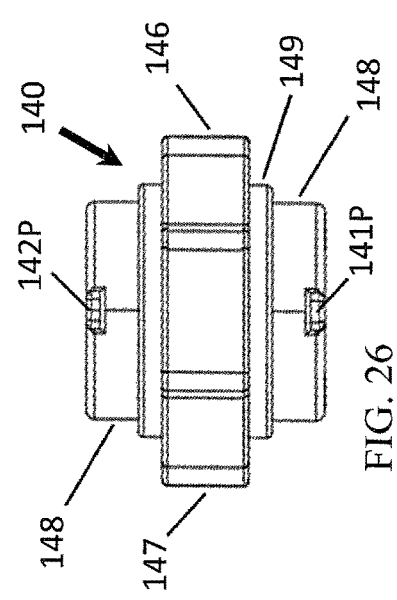
FIG. 26 is a bottom view of the receiver of the window balance assembly of FIG. 1.

As seen in FIGS. 23-27, the receiver 140 may be formed to have a cylindrical shape defined by a cylindrical surface 148 that may extend from a first end 141 to a second end 142. The ends of the cylindrical surface 148 may each be respectively rounded or chamfered at 141C and 142C. A respective protrusion 141P and 142P may also extend proximate to a portion of each of the first end 141 and second end 142, to help secure the receiver to the two housing portions, and as a consequence, also serves to secure the two housing portions together. As seen in FIG. 24 and FIG. 26, a cylindrical hub 149 may be concentrically and centrally positioned with respect to the cylindrical surface 148, and may be formed to have a slightly larger diameter. A generally rectangular shaped opening 140P may be formed in the cylindrical shape of cylindrical surface 148 to create a three-sided keyway (i.e., sides 143, 144, and 145) into which a portion of the window assembly (a "key") may be received in order to actuate/rotate the receiver 140 when the window is rotated inwardly. Protruding outwardly from the cylindrical surface 148 on a first side of the keyway (i.e., proximate to the long side 143) may be a first cam 146, and protruding outwardly from the cylindrical surface 148 on a second side of the keyway (i.e., proximate to the long side 145) may be a second cam 147. The shape of the second cam 147 may be a mirrored version of the shape of the first cam 146 (i.e., as seen in FIG. 25, the cam may be symmetrical about its centerline).

As seen in FIGS. 13-22A, the housing may be formed into two parts, which two parts may be exactly the same (i.e., being two halves), or which may alternatively be two unique parts, e.g., housing portion 110, and housing portion 120.

As seen in FIGS. 18-22A, the housing portion 110 may be formed to include a side wall 105, which may extend from a first side 111 to a second side 112, and from a top 113 to a bottom 114, and which may generally be rectangular in shape. A shaped protrusion 115 may protrude from the upper portion of the side wall 105, beginning at, or beginning proximate to, the top 113. The shaped protrusion 115 may extend only a small portion of the way towards the bottom 114, and may extend from the second end 112 to just short of the first end 111, terminating at 111C, which distance from first end 111 may provide space for the second portion 152 of the coil spring 150 to exit from the housing assembly (see FIG. 29). The lower-most portion of the shaped protrusion 115 may terminate in a retaining surface 115R, which is intended to support one side of the convolutions of the curl spring 150. The retaining surface 115R may be a portion of a cylindrical surface, i.e., a horizontal cylinder segment, or alternatively may be a different surface or combination of surfaces that may provide at least two points of contact with one side (e.g., at least a portion of one-half) of the convolutions of the curl spring 150 (see FIG. 28C), which may permit steady movement—uncurling of the curl spring—without noise. For example, the retaining surface 115R may be formed to include a first surface 115A and a second surface 115B that may be generally flat but angled with respect to each other, and may be used to limit upward movement of the top of the convolutions of the curl spring 150. The first surface 115A and second surface 115B may be connected via a transition surface 115C. Alternatively, instead of using the shaped protrusion 115, two cylindrical pegs (not shown) may be configured to protrude from the wall 105 to provide support for, and inhibit upward movement of, the convolutions. Similarly, a shaped protrusion 116 may protrude from the middle-to-lower portion of the side wall 105, and may extend from the first side 111 to the second side 112. The shaped protrusion 116 may be constructed to include a retaining surface 116R that may be formed using any of the surface configurations mentioned above for the shaped protrusion 115. As seen in FIG. 20, the housing 110 is shown formed, merely to be exemplary, with a retaining surface 116R that may generally be (or closely approximate) a cylinder segment, and with a retaining surface 115R being formed of several disparate surface shapes. As may be understood from FIG. 20 and FIG. 28C, a portion of the curl spring 150 may nest within, and be rotatably retained by, surfaces 115R and 116R. The side wall 105 of housing portion 110 may also be formed with an annular (circular-shaped) opening 105P that may be sized to receive and rotatably support a portion of the cylindrical surface 148 of receiver 140, and also a concentrically formed annular protrusion 117 that may support another portion of the receiver. The lower portion of the side wall 105 of housing portion 110 may also have one or more protrusions 118 that may form the bottom of the housing portion. The lower protrusion(s) 118 may have one or more apertures 118P formed therein, each being configured to receive a corresponding cylindrical protrusion that may be correspondingly formed on housing portion 120, to be usable in coupling the two housing portions together. Also, the upper protrusion 115 may have one or more apertures 115P formed therein, each being configured to receive a corresponding cylindrical protrusion on housing portion 120, also being usable to couple the two housing portions together. Each of the first side 111 and the second side 112 of the lower portion of the side wall 105 of housing portion 110 may be formed with an opening 105Pi and 105Pii, and corresponding cantilevered protrusions 119A and 119B that may protrude out from side wall 105. The cantilevered protrusions 119A and 119B may also extend down from the protrusion 116, and which may protrude out to plane 119e (FIG. 21), which may be farther away from side wall 105 than the distance that the protrusion 115 protrudes. The distal ends of the cantilevered protrusions 119A and 119B may therefore be free to flex outwardly when respectively driven (directly or indirectly) by the cams 146/147 of the receiver 140, as the sash window is rotated inwardly into dwelling/building. The exterior surface of each of cantilevered protrusions 119A and 119B may be formed with a series of undulations 119Ua and 119Ub, which may better grip the interior walls of the master window frame of the sash window (see FIG. 47), when the cams 146/147 of the receiver 140 drive the cantilevered protrusions outwardly, to releasably support the sash window at a particular height. The top of the protrusion 115 may be formed to include a first keyway 115Ki and a second keyway 115Kii, which keyways may be used to couple (i.e., to piggyback) an additional ("companion") balance shoe assembly thereto, as discussed hereinafter.

As seen in FIGS. 13-17, the housing portion 120 may be formed similar to the housing portion 110, with many of its features being a mirrored version of those on housing 110. The housing portion 120 may similarly be formed to include: a side wall 125 which may extend from a first side 121 to a second side 122, and from a top 123 to a bottom 124; a shaped upper protrusion 135 (with surfaces 135A, 135B, and 135C) being similar to protrusion 115; a shaped protrusion 136 (with surface 136R) protruding from the middle-to-lower portion of housing portion 120 being similar to protrusion 116; an annular opening 135P, from which may protrude an annular protrusion 137 that may be sized to receive, and rotatably support, the second portion of the cylindrical surface 148 of receiver 140; and one or more protrusions 138 being similar to the protrusion(s) 118 on housing portion 110, but instead having cylindrical protrusions 138P. The cantilevered protrusions 119A and 119B of housing portion 110 may be formed such they may be directly actuated by the cams 146/147 of the receiver 140, or alternatively, intermediate cantilevered members 139A and 139B may be formed on housing portion 120, and which may be directly actuated by the cams 146/147 of the receiver 140, and the cantilevered members 139A and 139B on housing portion 120 may in turn actuate the cantilevered protrusions 119A and 119B of housing portion 110, which may act as a brake for the sash window The housing portion 120 may also be formed to include a first keyway 135Ki and a second keyway 135Kii, being configured to align with the first keyway 115Ki and second keyway 115Kii of housing portion 110.

Assembly of the component parts of the window balance assembly 101 may be as follows.

Figure 28:
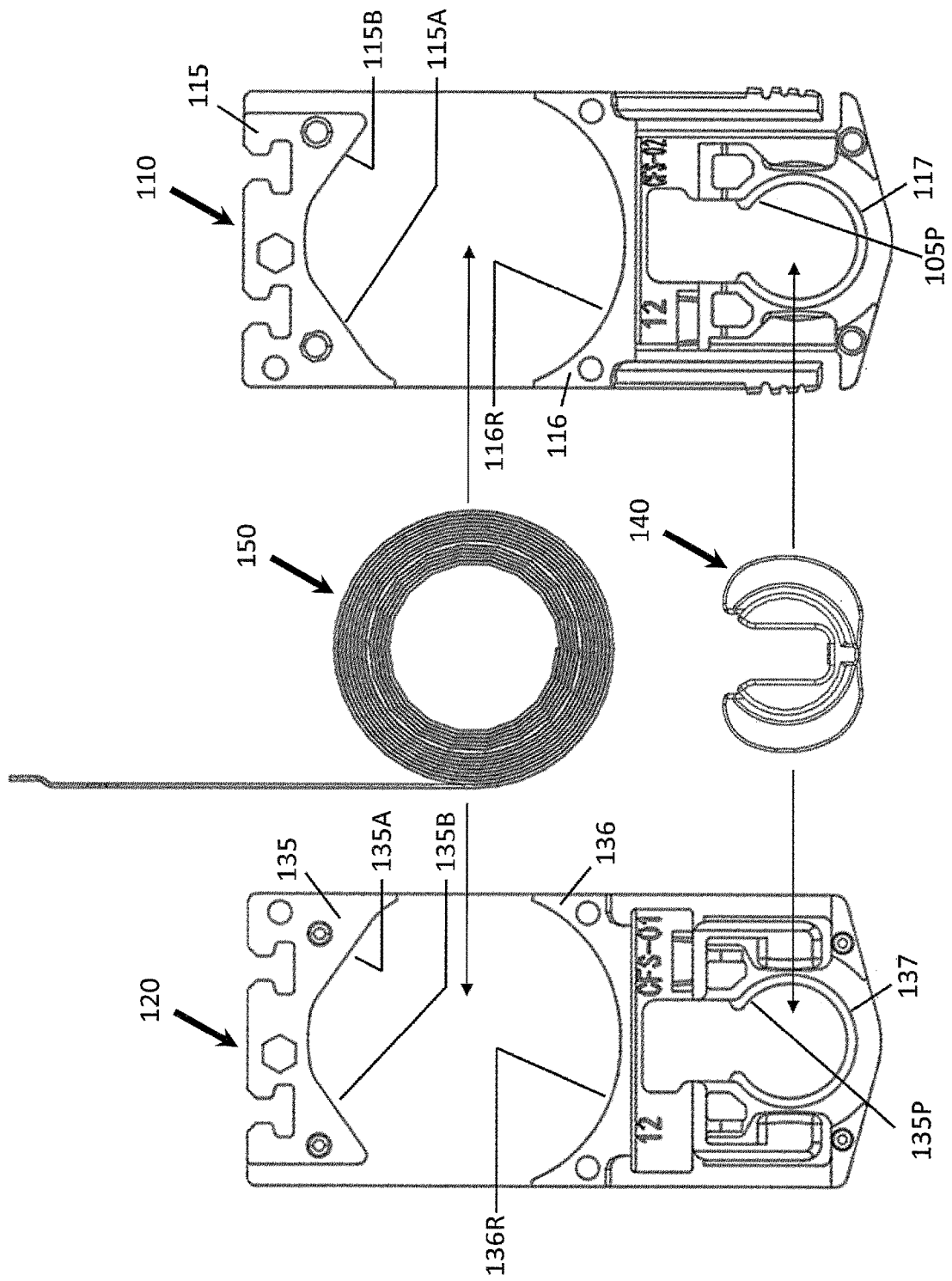
FIG. 28 shows the side views of the first housing portion, the curl spring, the receiver, and the second housing portion, prior to being assembled together.
Figure 28C:
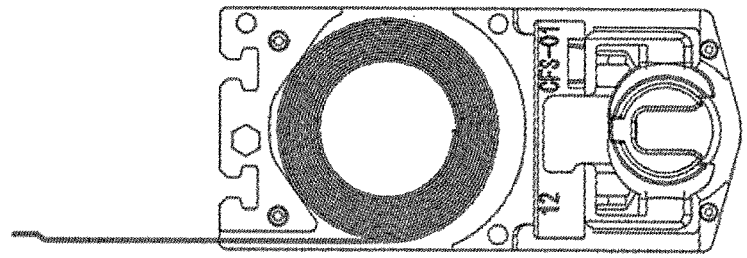
FIG. 28C is a view showing the first housing portion after the receiver and the curl spring have been installed in the first housing portion.
Figure 28B:
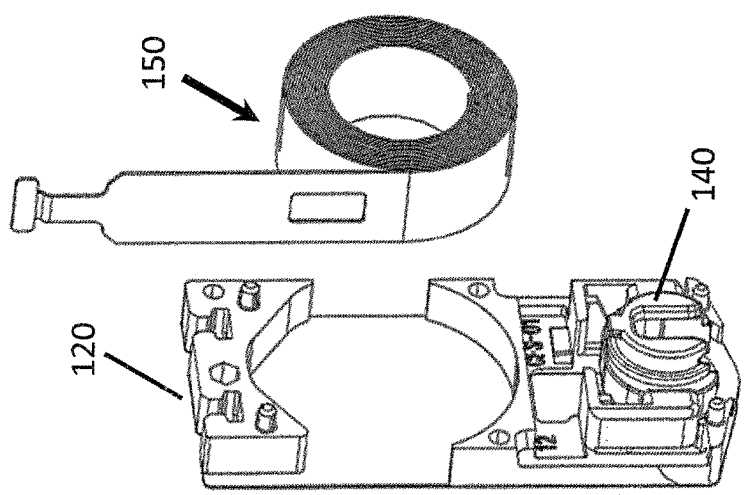
FIG. 28B is the perspective view of FIG. 28A, but is shown after the receiver has been installed in the first housing portion, and just prior to the curl spring being installed in the first housing portion.
Figure 28A:
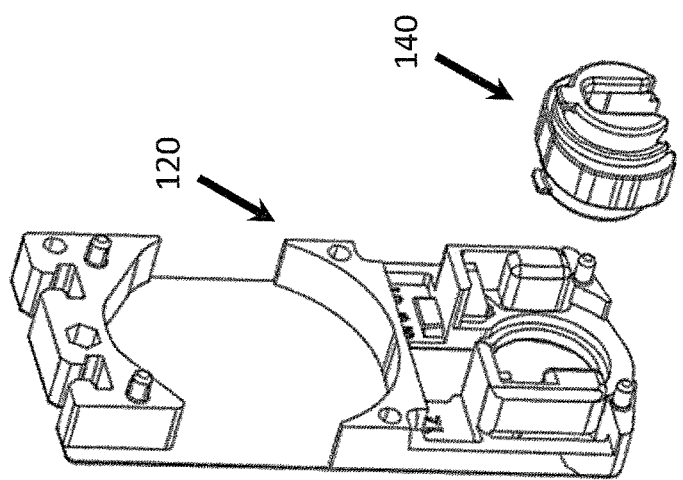
FIG. 28A shows a perspective view of the first housing portion and the receiver, shown just prior to the receiver being installed in the first housing portion.
Figure 29:
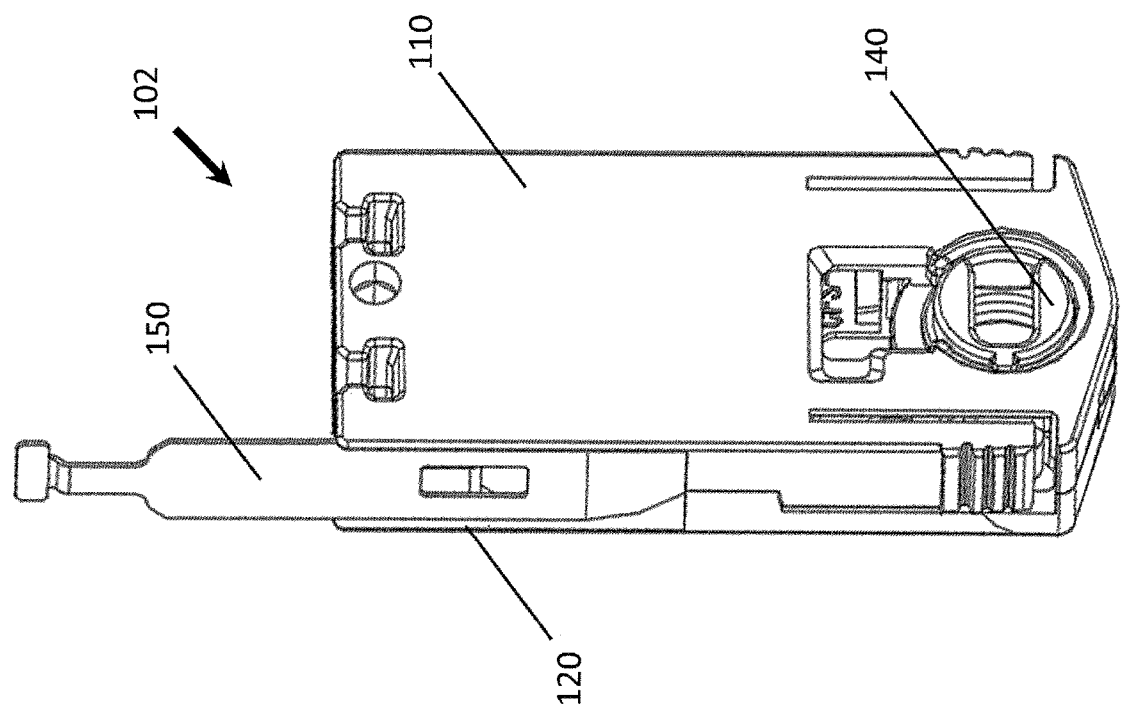
FIG. 29 is the perspective view of FIG. 28D, but is shown after the second housing portion has been secured to the first housing portion to form a balance shoe assembly.
Figure 28D:
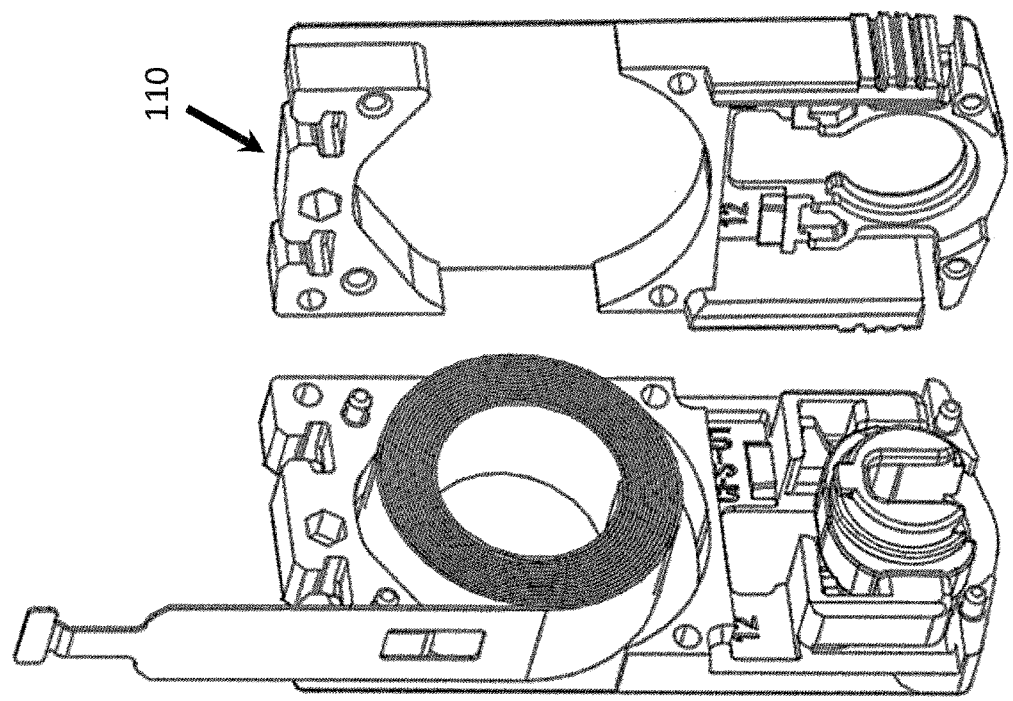
FIG. 28D is the perspective view of FIG. 28B, but is shown after the curl spring has been installed in the first housing portion, and just prior to the second housing portion being secured to the first housing portion.
Figure 35:
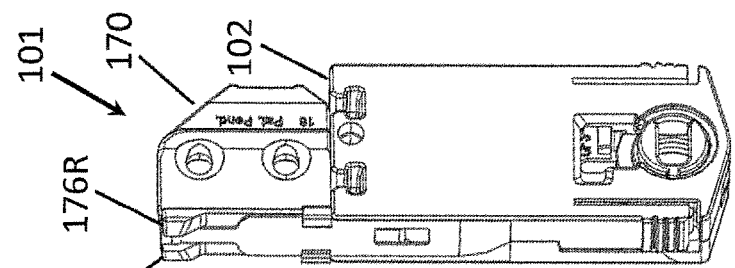
FIG. 35 shows the assembled housing portions, curl spring, and receiver of the balance shoe assembly, after the curl spring has been allowed to bias the head downwardly until opposite sides of the head are respectively received within a recess in each of the first ramp member and second ramp member.
Figure 34:
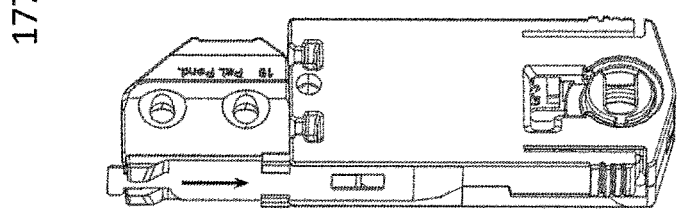
FIG. 34 shows the assembled housing portions, curl spring, and receiver of the balance shoe assembly, after the head of the curl spring has been advance further upwardly and is no longer in contact with and being deflected away from the rear surface of the mounting bracket by the first and second ramp members, and the neck of the curl spring tail is slidable received in the gap between the first ramp member and second ramp member.
Figure 33:
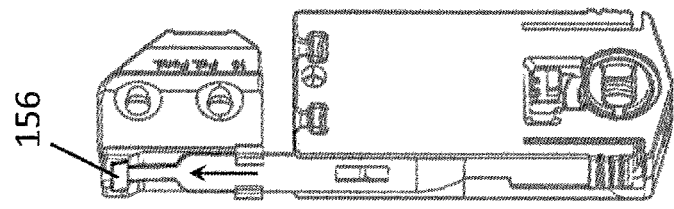
FIG. 33 shows the assembled housing portions, curl spring, and receiver of the balance shoe assembly, after the head of the curl spring has been advance further upwardly and is deflected away from the rear surface of the mounting bracket by riding up upon the first and second ramp members.
Figure 32:
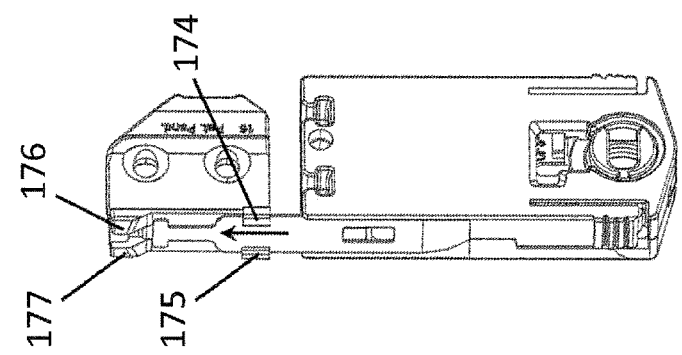
FIG. 32 shows the assembled housing portions, curl spring, and receiver of the balance shoe assembly, after the head of the curl spring has been advance upwardly to reach the first and second ramp members, and the full width of the curl spring is then nestled between the first guide member and second guide member of the mounting bracket.
Figure 31:
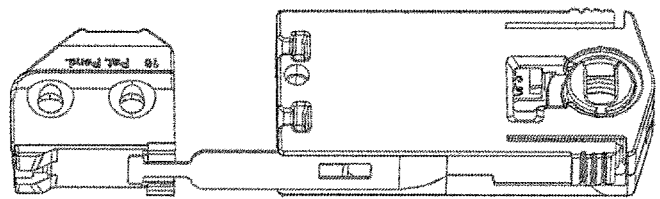
FIG. 31 shows the assembled housing portions, curl spring, and receiver of the balance shoe assembly, just after the neck of the curl spring is nestled between the first guide member and second guide member of the mounting bracket.
Figure 30:
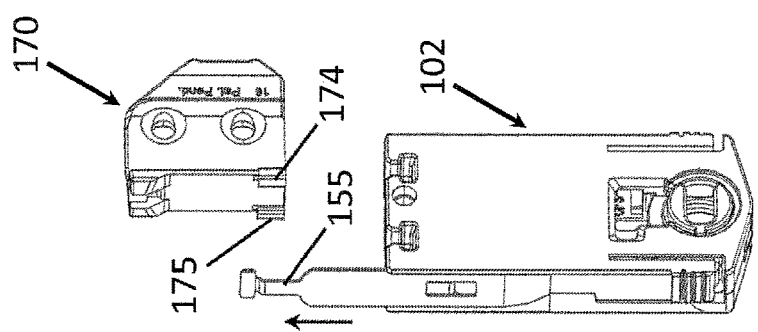
FIG. 30 shows the assembled housing portions, curl spring, and receiver of the balance shoe assembly, just prior to mating therewith of the mounting bracket.
Figure 72:
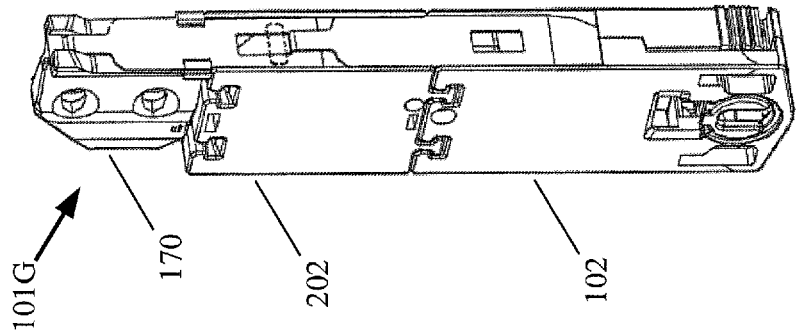
FIG. 72 is the perspective view of FIG. 71, but shown after the mounting bracket of FIG. 3 is coupled to the companion balance shoe assembly.

As may be understood from FIGS. 28 to 28D, first and second sides of the convolutions of the first portion 151 of the curl spring 150 may be disposed within the interior space created by the surfaces 115A, 115B, and 116R of protrusions 115 and 116 on housing portion 110 and the surfaces 135A, 135B, and 136R of protrusions 135 and 136 on housing portion 120. The two portions of the cylindrical surface 148 of receiver 140 may be rotatably received within a second interior space created by the opening 105P and protrusion 117 of housing 110 and by opening 135P and protrusion 137 of housing portion 120, and may be retained thereat by the protrusions 141P and 142P on the receiver. The curl spring 150, the receiver 140, and the housing portions 110 and 120 would thus be assembled together as seen in FIG. 29 to form the balance shoe assembly 102, with much of the second portion 152 of the curl spring 150 extending above and outside of the interior space formed by the two housing portions. The attachment of the mounting bracket 170 to the balance shoe assembly 102 of FIG. 29 is shown in FIGS. 30-35. The neck 155 of the second portion 152 of the curl spring 150 may be positioned as seen in FIG. 30 relative to the mounting bracket 170, and the neck may then be translated laterally to be positioned between the first and second guide members 174 and 175 on the rear surface 171R of the mounting bracket 170, as seen in FIG. 31. Next, as seen in FIG. 32, the curl spring 150 may be manually extended upwardly until the top of the head portion 156 reaches and contacts the ramp members 176 and 177, at which time the full width W1 of the curl spring 150 may be nested within the first and second retaining members 174 and 175. Manually causing further upward movement of the curl spring results in the ramp members deflecting the head outwardly and away from the rear surface 171R, as seen in FIG. 33. Causing even further upward movement of the curl spring results in the head portion 156 passing beyond the ramp surfaces of the ramp members 176 and 177, and returning of the wide second portion 152 of the curl spring 150 back into contact with the rear surface 171R of the mounting bracket 170, as seen in FIG. 34. Thereafter, once the manual force that was used to elevate the curl spring 150 is released, the curl spring will naturally self-bias itself to recurl into the two housing portions 110 and 120, and the two opposite sides of the bottom of the head portion 156 will be received within the respective recesses 176R and 177R of the first ramp member 176 and the second ramp member 177, as seen in FIG. 35. The length of the second portion 152 of the curl spring 150 may be selected to position the bottom of the mounting bracket 170 in proximity to, but just clear of being in contact with, the top of the housing portions 110/120. Alternatively, the curl spring may be configured to bias the bottom of the mounting bracket 170 into contact with the top surface of the housing portions 110/120. The fully assembled window balance assembly 101 is shown in the views of FIGS. 36-40.

A companion balance shoe assembly 202 (FIG. 69) may be formed as shown in FIGS. 48-68, and may be used in combination with the balance shoe assembly 102 and mounting bracket 170 (FIG. 70-82), whenever the additional lifting force of an extra spring may be required for a larger/heavier window.

The companion balance shoe assembly 202 shown in FIG. 69 may be formed of a first housing portion 210 shown in FIGS. 57-66, a second housing portion 220 shown in FIGS. 48-56, and a curl spring 250, which may be the same as, or may be formed slightly different than, curl spring 150.

The first housing portion 210 and the second housing portion 220 may be formed very similar to the first housing portion 110 and the second housing portion 120 of the balance shoe assembly 102, respectively, and may even be substantially the same except that they are not formed with the lower portion that includes the protrusions for braking and accommodations for the installation of, and interaction with, a receiver. Also, the bottom of the first housing portion 210 is formed to include protrusions 215Pi and 215Pii, and the bottom of the second housing portion 220 is formed to include protrusions 225Pi and 225Pii that are formed to align with the protrusions 215Pi and 215Pii on housing portion 210, when the housing portions are joined together (see FIG. 64). These aligned pairs of protrusions form a pair of "keys" that are configured to slide into and interlock with the corresponding pairs of keyways formed on the tops of the housing portions 110 and 120 of the balance shoe assembly 102 (see FIG. 70 and FIG. 71), i.e., being interlocked with the aligned first and second keyways of each of the first housing portion 110 and the second housing portion 120 (keyways 115Ki and 115Kii and keyways 135Ki and 135Kii).

Note that the tops of the first housing portion 210 and the second housing portion 220 may also be formed similar to the first housing portion 110 and the second housing portion 120, as they may also be formed to include keyways that may be used to couple (i.e., to piggyback) an additional (third) companion balance shoe assembly thereto.

Figure 71:
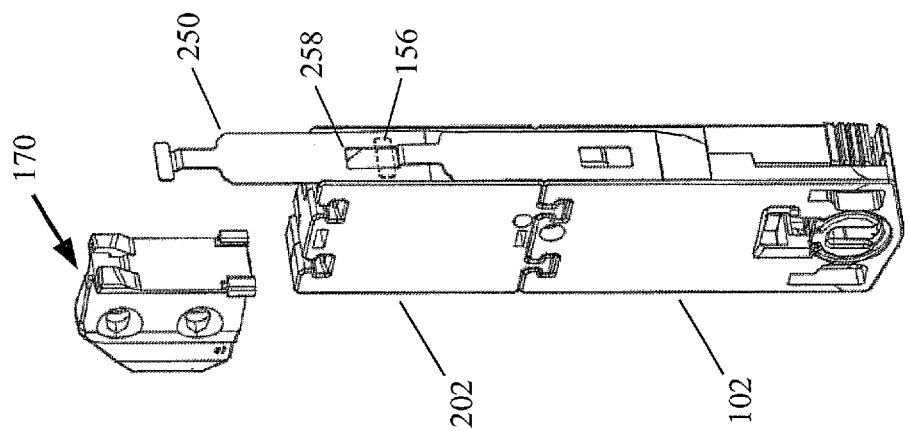
FIG. 71 is the perspective view of FIG. 70, but shown after the balance shoe assembly of FIG. 29 and the companion balance shoe assembly of FIG. 69 are joined together.
Figure 70:
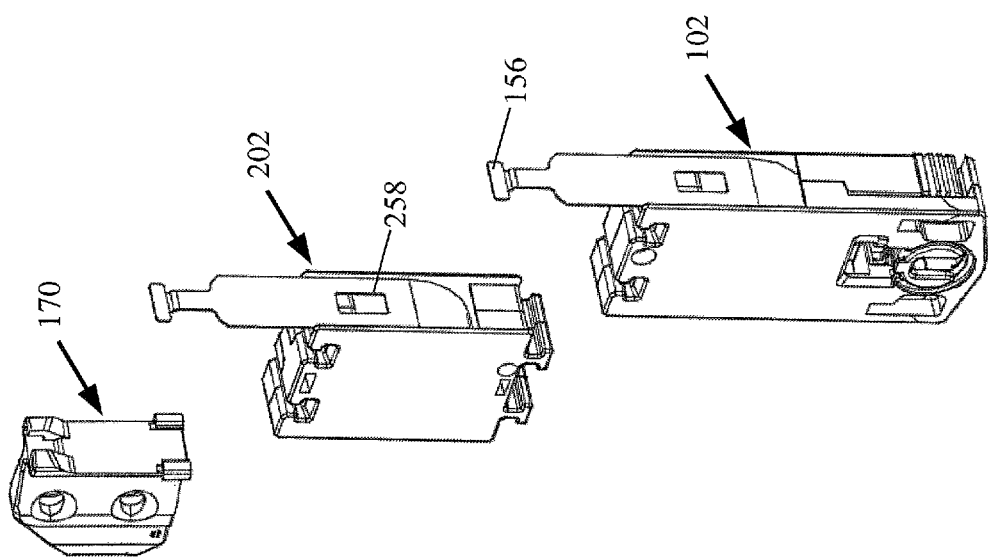
FIG. 70 is a perspective view showing the balance shoe assembly of FIG. 29, the companion balance shoe assembly of FIG. 69, and the mounting bracket of FIG. 3, shown prior to being coupled together.

As seen in FIG. 70 and FIG. 71, the curl spring 150 of the balance shoe assembly 102 may be coupled to the spring 250 to move therewith, by inserting the elongated head portion 156 into the opening 258. The rectangular dimensions of the opening 258 may be slightly larger than the rectangular dimensions of the elongated head portion 156, permitting the head to be inserted through the opening, and then the balance shoe assembly 102 and the curl spring 250 may be rotated 90 degrees to be as seen in FIG. 71, effectively locking the two springs together once the keys are mated with the keyways. The mounting bracket 170 may be coupled to the spring 250 the same as described hereinabove with respect to otherwise being coupled to spring 150, to form the ganged window balance assembly 101G seen in FIG. 72.

Figure 75:
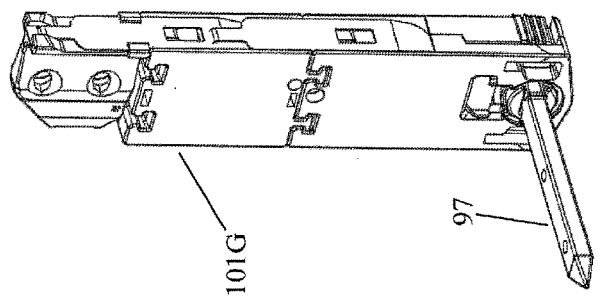
FIG. 75 is the perspective view of FIG. 74, but is shown just after the primary balance shoe assembly has been mounted upon the pivot pin that is securable to the sliding sash window.
Figure 74:
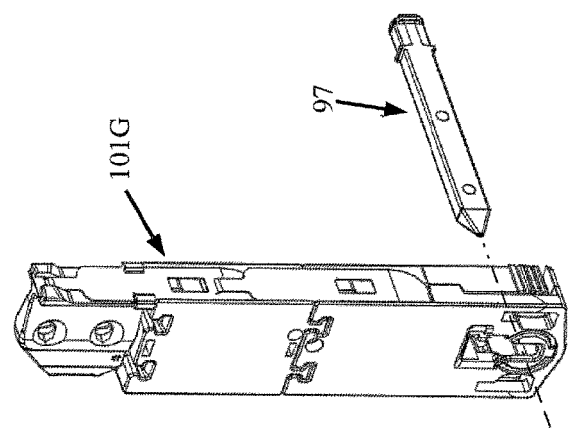
FIG. 74 is a perspective view showing the assembled balance shoe assembly, companion balance shoe assembly, and mounting bracket, as seen in FIG. 72, but is shown just prior to the receiver of the primary balance shoe assembly being mounted upon a pivot pin that is securable to the sliding sash window.
Figure 76:
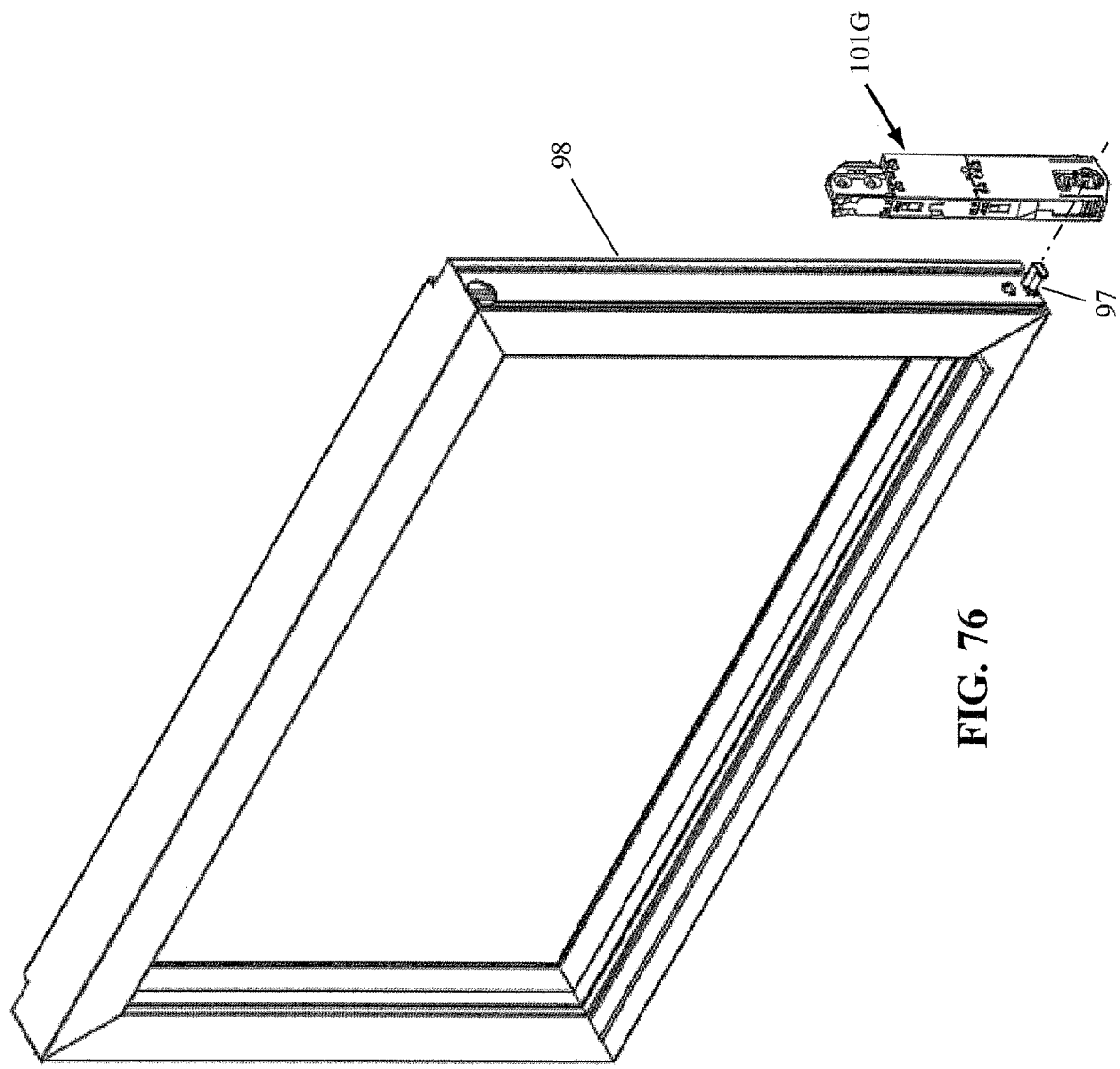
FIG. 76 is a perspective view showing the sliding sash window of FIG. 73 by itself, and with the pivot pin of FIG. 74 after being secured to the sash window, with the assembled balance shoe assembly, companion balance shoe assembly, and mounting bracket, as seen in FIG. 72, shown displaced therefrom.

As seen in FIG. 73, the window balance assembly 101 (FIG. 36) or the ganged window balance assembly 101G (FIG. 72) may be received in a channel in the master window frame 99, and its receiver 140 may be coupled to the sash window 98, as seen in FIGS. 74-76, using a pivot pin 97, which may pass through and engage with the three-sided keyway (i.e., sides 143, 144, and 145) of receiver 140, as seen in FIG. 75.

FIG. 76 is a perspective view showing the sliding sash window of FIG. 73 by itself, and with the pivot pin 97 after being secured to the sash window, with the ganged window balance assembly 101G shown displaced therefrom.

Figure 79:
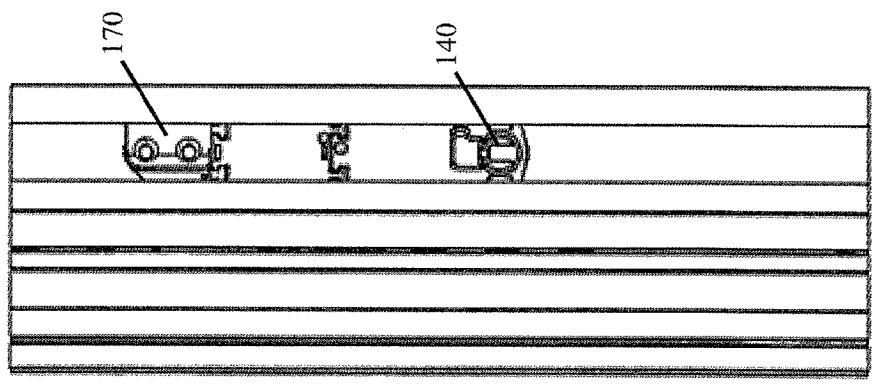
FIG. 79 is the side view of FIG. 78, showing the joined balance shoe assembly and companion balance shoe in the track of the master window frame corresponding to a second sash window position, with the curl spring extended a second distance.
Figure 78:
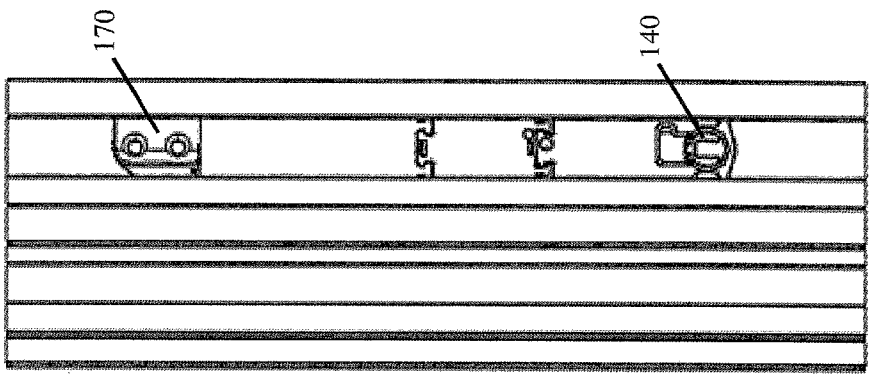
FIG. 78 is a side view of the arrangement shown in FIG. 77, showing the joined balance shoe assembly and companion balance shoe in the track of the master window frame corresponding to a first sash window position, with the curl spring extended a first distance.
Figure 77:
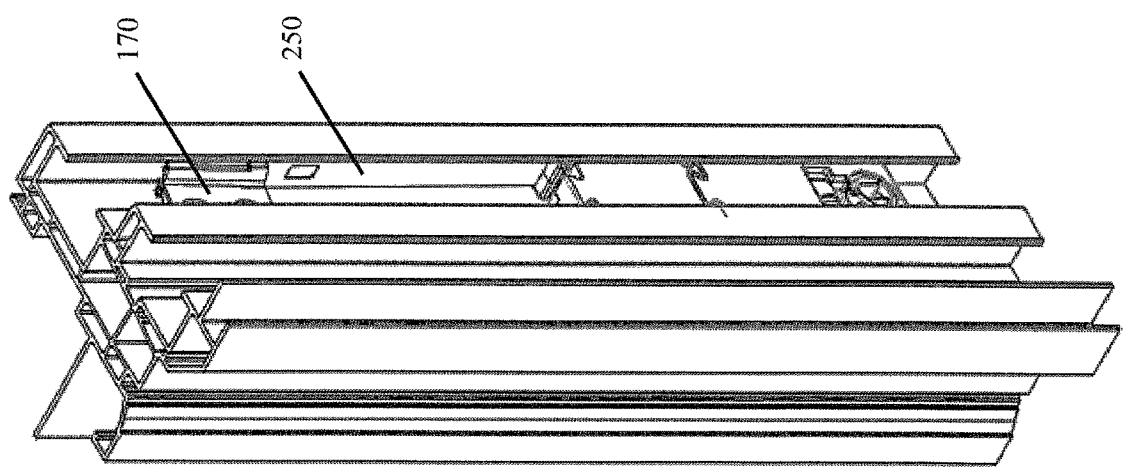
FIG. 77 is a cut-away perspective view of a portion of the master window frame of FIG. 73, with the assembled balance shoe assembly, companion balance shoe assembly, and mounting bracket installed therein.

FIG. 77 is a cut-away perspective view of a portion of the master window frame of FIG. 73, with the ganged window balance assembly 101G installed therein. As seen in FIGS. 77-79, the pair of apertures 172Ai and 172Aii in the second flange 172 of the mounting bracket 170 may be used in combination with screws to secure the mounting bracket to the master window frame 99, such that movement of the sash window within the master window frame causes the curl spring to extend (compare FIG. 78 and FIG. 79).

FIG. 78 shows the ganged window balance assembly 101G in the track of the master window frame corresponding to a first sash window position, with the curl spring extended a first distance, while FIG. 79 shows the ganged window balance assembly 101G in the track of the master window frame corresponding to a second (elevated) sash window position, where the curl spring may be extended a second distance, or the mounting bracket may be bottomed out on the top of the companion balance shoe assembly 202.

Figure 80:
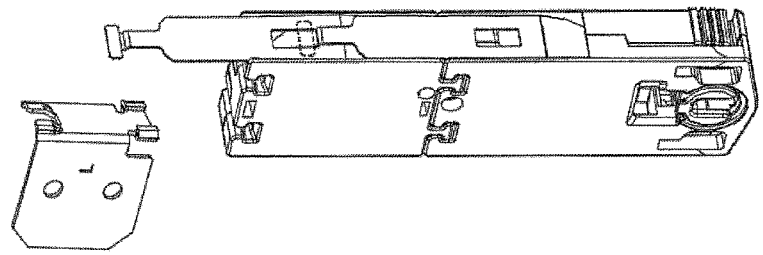
FIG. 80 is a perspective view showing the balance shoe assembly of FIG. 29 and the companion balance shoe assembly of FIG. 69 after being joined together, but is shown just prior to coupling thereto of the second mounting bracket embodiment shown in FIG. 41A.
Figure 86:
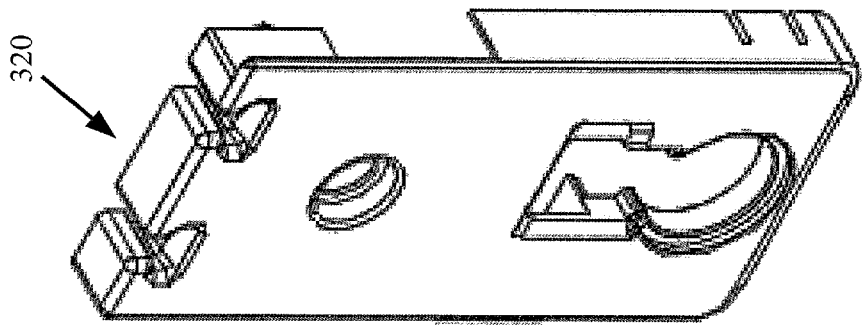
FIG. 83, FIG. 84, FIG. 85, and FIG. 86 are first, second, third, and fourth perspective views of another embodiment of a first housing portion usable for forming another primary balance shoe assembly.
Figure 85:
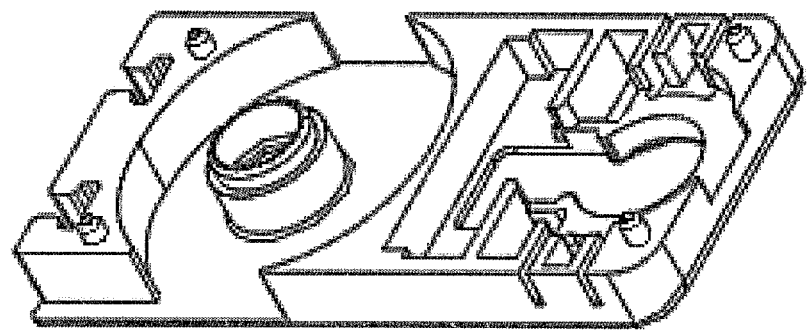
Figure 84:
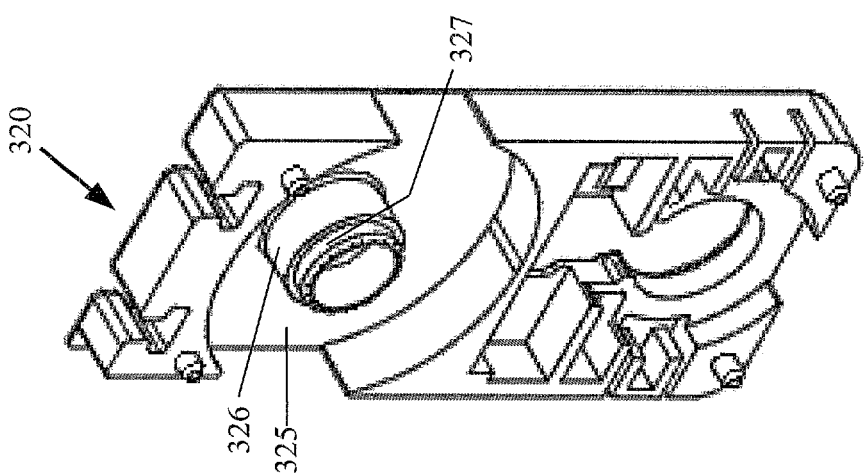

FIG. 80 is a perspective view showing the balance shoe assembly of FIG. 29 and the companion balance shoe assembly of FIG. 69 after being joined together, but is shown just prior to coupling thereto of the second mounting bracket embodiment—mounting bracket 180 shown in FIGS. 41A-46. The mounting bracket 180 may be formed similar to mounting bracket 170, having a first flange 181 and second flange 182, and may also have a first guide member 184 and a second guide member 185, each of which may protrude from the rear surface 181R of the first flange 181. However, the first flange 181 of the mounting bracket 180 may be formed without any ramp members, but may nonetheless be formed to include a pair of recesses (181Ri and 181Rii) at the top of the first flange 181.

Figure 82:
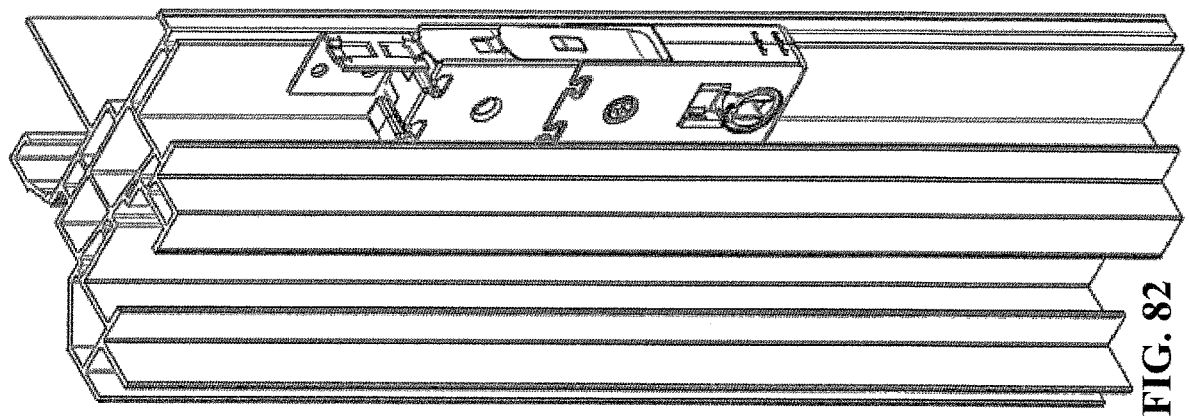
FIG. 82 is a perspective view showing the assembled balance shoe assembly, the companion balance shoe assembly, and the mounting bracket as seen in FIG. 81, after being installed in the track of the master window frame of FIG. 73.
Figure 81:
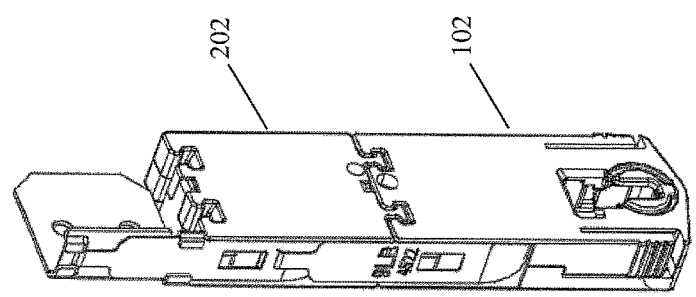
FIG. 81 is the perspective view of FIG. 80, but is shown just after mounting bracket embodiment of FIG. 41A is coupled to the companion balance shoe assembly.

FIG. 81 shows the leaf spring 250 of the companion balance shoe assembly 202 nested between the guide members 184 and 185 of the mounting bracket 180, and with the head of the leaf spring received in the recesses 181Ri and 181Rii of the mounting bracket 180. As seen in FIG. 82, the second flange 182 of the mounting bracket 180 may secured to the track of the master window frame using mechanical fasteners.

FIGS. 93-101 show views of another embodiment of a first housing portion 310, while FIGS. 83-92 show views of another embodiment of a second housing portion 320, both of which are usable for forming another primary balance shoe assembly 302, as seen in FIG. 139, which may be made of metallic parts, instead of plastic parts.

Figure 96:
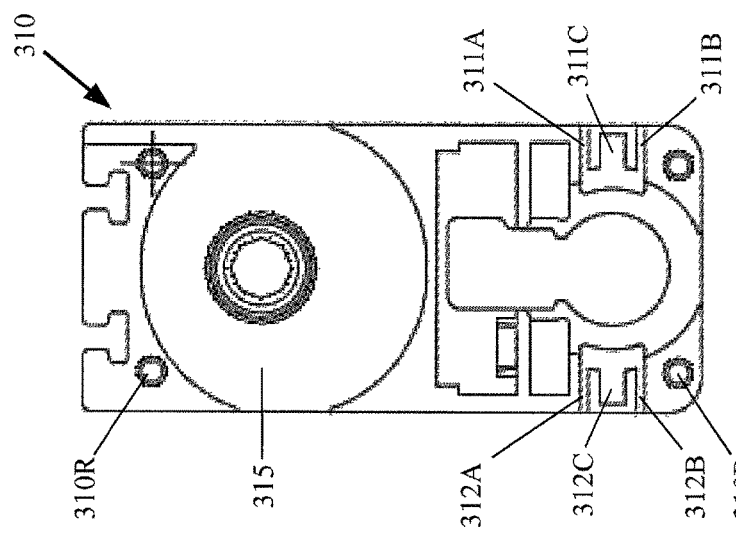
FIG. 96 is a first side view of the second housing portion of FIG. 93.
Figure 100:
FIG. 100 is a bottom view of the second housing portion of FIG. 93.
Figure 97:
FIG. 97 is a first end view of the second housing portion of FIG. 93.

Each of the first housing portion 310 and second housing portion 320 may be formed the same as housing portions 210 and 220 to support the receiver 140, and to support the curl spring 150. However, the first housing portion 310 and second housing portion 320 may be formed without the corresponding protrusions 139A/139B and protrusions 119A/119B used on the first and second housing portions 110 and 120 for braking. Instead, a separate braking member 330 (FIGS. 111-119) may be used, and which may have a channel-shaped cross-section that may be slidably supported by correspondingly shaped recesses on each side of both the first housing portion 310 and second housing portion 320. As seen in FIG. 87, one-half of a first channel-shaped braking member 330 may be slidably received in slotted openings 321A and 321B on one side of the housing portion 320, while one-half of a second channel-shaped braking member 330 may be slidably received in slotted openings 322A and 322B on the other side of the housing portion 320. The other half of the two braking members 330 may be slidably supported by corresponding slotted openings 311A and 311B on one side of the housing portion 310 and slotted openings 322A and 322B on the other side of the housing portion 310, as seen in FIG. 96. Being so mounted (see FIGS. 131-132), each of the braking members 330 may slide from a first (retracted) position as seen in FIG. 140, to a second (extended) position at which the distal ends of the braking members 330 may protrude out from the two housing portions, as seen in FIG. 139 and FIG. 141, when the receiver 140 is rotated from the first position to the second position. The distal ends of the braking members 330 may be formed to include pointed protrusions 331, which may enable better engagement with the interior wall of the master window frame (see FIG. 141). To ensure that the pointed protrusions 331 of the braking members 330 disengage from the interior wall of the master window frame when the receiver is rotated from its second position back to the first position, a pair of springs may be used to bias the braking members 330 towards the first (retracted) braking member position. A first leaf spring 380, as seen in FIGS. 124-130, may be positioned in each of a respective recess 311C and 321C of the first and second housing portions 310/320 to bias the first braking member 330, while a second leaf spring 380 may be may be positioned in each of a respective recess 312C and 322C of the first and second housing portions 310/320 to bias the second braking member 330 (see e.g., FIG. 133-134). Any type of spring may be used for biasing, including but not limited to a helical spring, and a leaf spring; leaf spring 330 is shown in the figures merely to be illustrative. The leaf spring 330 may be formed to include a pair of parallel flanges 381 and 382, which may respectively butt against an interior wall of the housing and against one side of the braking member 330 (see e.g., FIG. 140).

As seen in FIG. 135A and FIGS. 74-75, a blocking plate 360 may be slidably installed with respect to the first and second housing portions 310 and 320, and may be usable to prevent the pivot pin 97 from being removed with respect to the receiver 140. The blocking plate 360 is shown in detail in FIGS. 102-110, and may include a plurality of legs 361, 362, 363, and 364, which may be slidably supported (e.g., in a respective recess) in each of the first and second housing portions 310 and 320. The blocking plate 360 may also have a first flange 365, and a second flange 366, which may protrude from opposites side of the blocking member. As seen in FIG. 139, the first flange 365 and the second flange 366 may be exposed through a respective opening in the first and second housing portions 310 and 320, permitting it to be slid from a first (non-blocking) position shown in FIG. 142 to a second (blocking) position shown in FIG. 143, in which the pivot pin 97 cannot be slidably removed from the shoe. When the blocking plate 360 is in the non-blocking position shown in FIG. 142, the pivot pin 97 may be slid relative to the 140, as indicated by the arrow therein, and may be removed from the shoe. The blocking plate 360 may be retained in the blocking position using friction fit and/or a detent mechanism.

The primary balance shoe assembly 302, as seen in FIG. 139, may also be formed to include an adjustment feature, whereby an adjusting screw 390 may be used to adjust positioning of the first housing portion 310 with respect to the second housing portion 320, to adjust an amount of friction applied to the curl spring contained therein, to adjust (e.g., to increase) the balance force thereby provided to the sash window disposed in the master window frame.

As seen in FIGS. 93-96, the first housing portion 310 may be formed with a hollow cylinder 316 that may protrude from the wall 315, and which may be formed with a concentric internally formed recess crating an internal cylindrical surface 317. Similarly, as seen in FIGS. 83-87, the second housing portion 320 may be formed with a hollow cylinder 326 that may protrude from the wall 325, and which may be formed with a concentric externally formed recess to create a concentric cylinder 327 having a smaller diameter. As seen in FIG. 140, the positioning of the hollow cylinders in the first and second housing portions 310 and 320 does not interfere with operation of the curl spring. When the first and second housing portions 310 and 320 are joined together, with the protrusions 320P being received in the recesses 310R, the hollow cylinder 316 of the first housing portion may mate with the hollow cylinder 326 of the second housing portion, whereby the concentric cylinder 327 is engaged within a portion of the internal cylindrical surface 317. The adjusting screw 390 is shown in detail in FIGS. 120-123. The adjusting screw 390 may be threadably coupled to at least one of the first and second housing portions 310 and 320, to clamp the housing walls 315 and 325 upon the curl spring, to increase friction therebetween, to provide a greater resisting force to counter the weight of the sash window (i.e., to increase the balance load range).

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A window balance assembly comprising:
    a housing, said housing defining a first interior space and a second interior space;
    a receiver, said receiver being rotatably supported in said first interior space, said receiver comprising:
        a hub; and
        at least one cam, said at least one cam positioned on a first side of said hub;
    a curl spring, said curl spring comprising: a first portion disposed within said second interior space and comprising: a plurality of convolutions; and a second portion, said second portion configured to extend outside of said second interior space;
    at least one braking member, said at least one braking member being slidably mounted in said housing, and being configured to slide from a first position to a second position at which a portion of said at least one braking member protrudes outside of said housing; and
    wherein when said receiver is rotated from a first position to a second position, said at least one cam drives said at least one braking member from said first position to said second position where said portion of said at least one braking member protruding out from said housing engages with a wall of a master window frame to releasably maintain a position of said window balance assembly with respect to the master window frame.

2. The window balance assembly according to claim 1, wherein said at least one cam comprises:
    a first cam on a first side of said hub; and:
    a second cam on a second side of said hub;
    wherein said at least one braking member comprises:
        a first braking member positioned in a first side of said housing; and:
        a second braking member positioned in a second side of said housing; and
    wherein when said receiver is rotated from said first position to said second position, said first cam drives said first braking member from a first brake member position to a second brake member position where a portion of said first braking member protrudes out from said housing and engages with a first wall portion of the master window frame, and said second cam drives said second braking member from a third brake member position to a fourth brake member position where a portion of said second braking member protrudes out from said housing and engages with a second wall portion of the master window frame.

3. The window balance assembly according to claim 2, further comprising:
    a first spring, said first spring configured to bias said first braking member towards said first brake member position; and
    a second spring, said second spring configured to bias said second braking member towards said third brake member position.

4. The window balance assembly according to claim 3, wherein said braking member is formed as a C-shaped member.

5. A window balance assembly comprising:
    a housing, said housing defining a first interior space and a second interior space; wherein said housing comprises:
        a first housing portion;
        a second housing portion;
        wherein said second housing portion is configured to slidably secure to said first housing portion;
        wherein said first housing portion comprises: an internally threaded opening;
        wherein said second housing portion comprises: an internally threaded opening;
    a receiver, said receiver being rotatably supported in said first interior space, said receiver comprising:
        a hub; and
        at least one cam, said at least one cam positioned on a first side of said hub;
    a curl spring, said curl spring comprising: a first portion disposed within said second interior space and comprising: a plurality of convolutions; and a second portion;
    at least one braking member, said at least one braking member being configured such that when said receiver is rotated from a first position to a second position, said at least one cam drives said at least one braking member to slide from a first position to a second position where a portion of said at least one braking member protrudes out from said housing and engages with a wall of a master window frame to releasably maintain a position of said window balance assembly with respect to the master window frame;
    an adjustment screw; and
    wherein said adjustment screw is configured to be threadably received in said internally threaded opening of said first housing portion and said internally threaded opening of said second housing portion to adjust an amount of compression applied by said first and second housing portions to said curl spring, to adjust an amount of friction therebetween to adjust a balance force provided to a sash window disposed in the master window frame.

6. The window balance assembly according to claim 5, further comprising:
    at least one spring, said at least one spring configured to bias said at least one braking member towards said first position.

7. A window balance assembly comprising:
    a housing:
    a receiver, said receiver being rotatably supported in said first housing, said receiver comprising:
        a hub;
        a keyway, said keyway configured to slidably receive a pivot pin of a master window frame; and
        at least one cam, said at least one cam positioned on a first side of said hub;
    a curl spring, said curl spring comprising: a first portion disposed within said housing and comprising: a plurality of convolutions; and a second portion;
    at least one braking member, said at least one braking member being configured such that when said receiver is rotated from a first position to a second position, said at least one cam drives said at least one braking member to slide from a first position to a second position where a portion of said at least one braking member protrudes out from said housing and engages with a wall of the master window frame to releasably maintain a position of said window balance assembly with respect to the master window frame;

a blocking plate, said blocking plate comprising at least one flange configured to protrude out of an opening in said housing;

wherein said blocking plate is slidably installed within said housing and configured to be actuated using said at least one flange to slide between a first blocking plate position and a second blocking plate position;

wherein when said blocking plate is in said first blocking plate position, a portion of said blocking plate inhibits sliding movement of the pivot pin relative to said keyway of said receiver; and wherein when said blocking plate is in said second blocking plate position, said blocking plate permits sliding movement of the pivot pin relative to said keyway of said receiver to facilitate its removal.

* * * * *